United States Patent
Makam et al.

(10) Patent No.: US 10,162,944 B2
(45) Date of Patent: Dec. 25, 2018

(54) LIBRARY STYLE MEDIA DRM APIS IN A HOSTED ARCHITECTURE

(71) Applicant: ARRIS Enterprises LLC, Suwanee, GA (US)

(72) Inventors: Ambikacharan P. Makam, San Diego, CA (US); Paul Moroney, La Jolla, CA (US); Steven Anderson, San Diego, CA (US); Rafie Shamsaasef, San Diego, CA (US); Nicol C. P. So, Newtown, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 176 days.

(21) Appl. No.: 15/085,970

(22) Filed: Mar. 30, 2016

(65) Prior Publication Data

US 2016/0292398 A1    Oct. 6, 2016

Related U.S. Application Data

(60) Provisional application No. 62/140,076, filed on Mar. 30, 2015.

(51) Int. Cl.
*H04L 29/00* (2006.01)
*G06F 21/10* (2013.01)
*H04L 29/06* (2006.01)

(52) U.S. Cl.
CPC ............ *G06F 21/105* (2013.01); *H04L 63/06* (2013.01); *H04L 2463/101* (2013.01)

(58) Field of Classification Search
CPC .. G06F 21/105; H04L 63/06; H04L 2463/101
See application file for complete search history.

(56) References Cited

U.S. PATENT DOCUMENTS

| | | | | |
|---|---|---|---|---|
| 7,319,759 | B1 * | 1/2008 | Peinado | H04L 9/0825 380/277 |
| 2004/0001594 | A1 * | 1/2004 | Krishnaswamy | H04L 63/0428 380/277 |
| 2004/0003270 | A1 * | 1/2004 | Bourne | G06F 21/10 713/193 |
| 2004/0158731 | A1 * | 8/2004 | Narin | G06F 21/6263 726/27 |
| 2014/0047558 | A1 * | 2/2014 | Veerubhotla | G06F 21/105 726/28 |

* cited by examiner

*Primary Examiner* — Morshed Mehedi
(74) *Attorney, Agent, or Firm* — Thomas A. Ward

(57) ABSTRACT

Systems and methods are provided for digital rights management of licensed media content. Client library components and server library components provide digital rights management services. A client-side hosting application accesses client library functionality through invocation of client application programming interfaces (APIs). A server-side hosting application accesses server library functionality through invocation of server APIs. Licenses for specific media content can be requested and issued, and appropriately licensed media content can be played. Client and server library components can function essentially absent direct communication, such as that employing a transport layer. Communications between client and server library components can be carried by the hosting applications.

8 Claims, 15 Drawing Sheets

FIG 5

5001 Content Key and Rights Information

5002
License server performs authorization check for the requested content with its own back office server database

5003
License server provides the request DRM message, content key and rights information to ASMS DRM lib

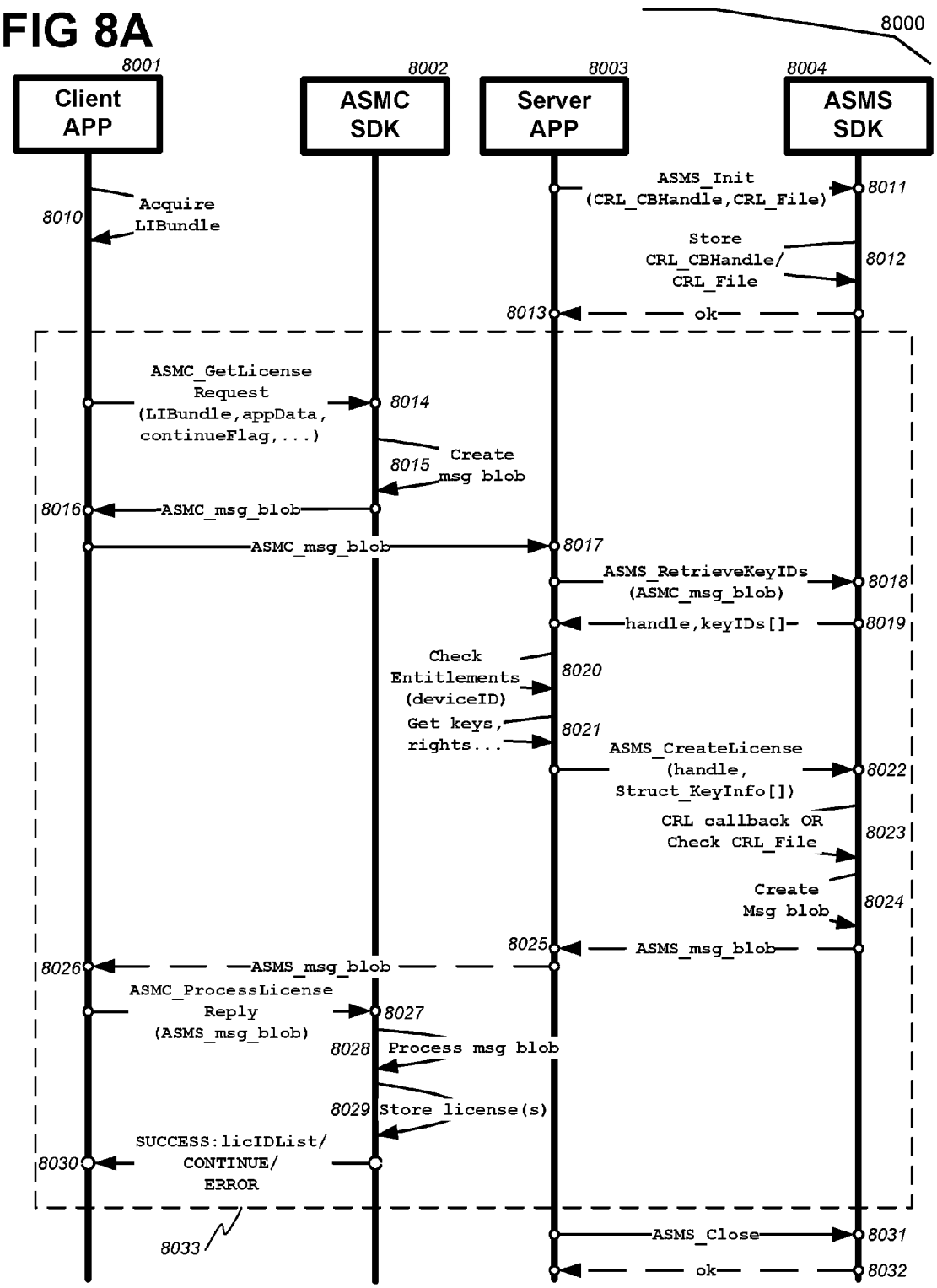

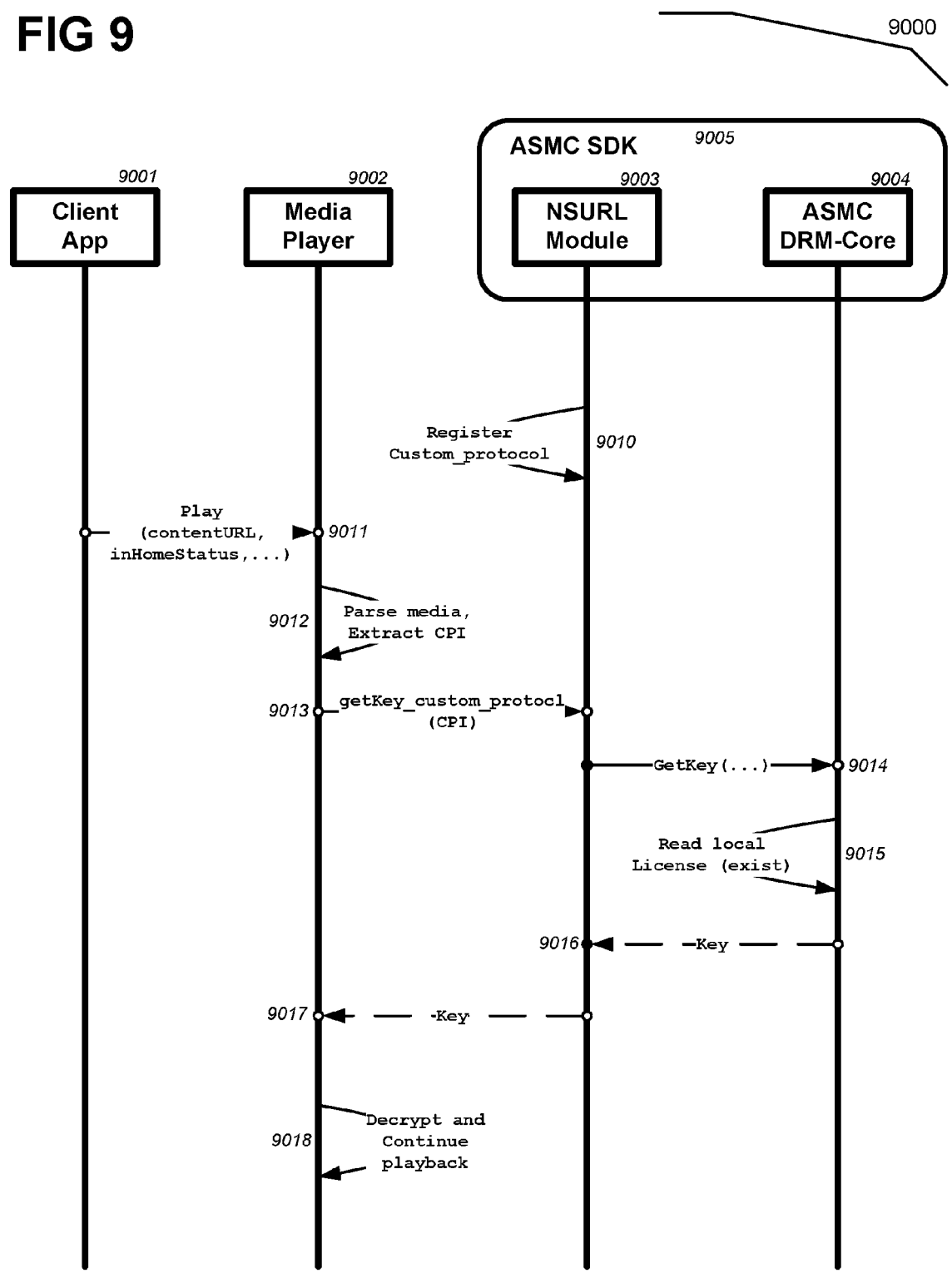

LIBRARY STYLE MEDIA DRM APIS IN A HOSTED ARCHITECTURE

CLAIM OF PRIORITY

This application claims priority under 35 U.S.C. § 119(e) from earlier filed U.S. Provisional Application Ser. No. 62/140,076, filed Mar. 30, 2015, which is hereby incorporated by reference.

TECHNICAL FIELD

The present disclosure relates to the field of digital rights management (DRM), particularly to client and server DRM services in association with client and server applications.

BACKGROUND

Typical digital rights management (DRM) systems and methods comprise end-to-end structures in which a client DRM module directly and actively communicates with a server DRM module, in order to perform DRM related transactions. A client DRM module and server DRM module typically communicate directly, via a transport layer. The server DRM module can be stateful, and can persist a database. In such systems, the communication scheme for client and server DRM modules can be additional to and can rely on underlying communication schemes. In such systems, the communication scheme for client and server DRM modules can replicate network services that are managed by a hosting system.

SUMMARY

Thus, DRM systems and methods are needed that can easily integrate and work within an existing ecosystem, without necessarily replicating and/or relying on some underlying communication schemes and without need to persist a database on the server. Such systems and methods can be adapted to end-to-end media delivery systems by integrating into the end-point processes of content injection and content consumption.

Systems and methods for digital rights management of licensed media content are depicted and described herein. Client library components and server library components can provide digital rights management services. Such services can be provided in association with specified operating system platforms. A client-side hosting application can access client library functionality through invocation of client application programming interfaces (APIs). A server-side hosting application can access server library functionality through invocation of server APIs. Licenses, that is, DRM licenses, for specific media content can be requested and issued, and thus appropriately licensed media content can be accessed and/or played.

In some embodiments, a server-side hosting application can proactively issue such licenses to a client. That is, a client application can be issued licenses additional to those requested. Identification of specific media content corresponding to the additional licenses can be responsive to license cues. License cues can comprise specified parameters such as those associated with a user profile, and/or usage patterns.

License Identification Information (LII) can be delivered by more than one mechanism. A license request transaction can convey a bundled plurality of LII. Thus a single instance of a license request transaction can request a plurality of licenses. A hosting application can retrieve LII from a backend system, or, embed LII in content files. Delivery mechanisms support both of license prefetching and obtaining a license at time of playback.

Client and server library components support abstraction at the client application level. A relatively small number of calls from, and interactions with, the client application can deliver powerful specific DRM services comprising many interactions and steps. Some of the invocations of such DRM services can be absent direct interactions with the client application.

In one embodiment, the present disclosure provides for a method for digital rights management (DRM) of licensed media content, the method comprising provisioning a DRM client module with a unique client certificate and storing the certificate, a client application issuing a DRM license request that corresponds to specified media content and employs the certificate and occurs after a specific interaction between a client application and the DRM client module, the client application receiving in response to the DRM license request a first DRM license and additional DRM licenses respectively corresponding to the specified media content and additional media content, the DRM client module deriving a content key from the first DRM license, the client application initiating play of the specified media content, and, the playing of the specified media content by employing the content key.

In another provided embodiment of a method for digital rights management of licensed media content, a method comprises provisioning a DRM client module with a unique client certificate and storing the certificate, a client application initiating play of specified media content, the client application receiving a notification of license need, the client application issuing a DRM license request that corresponds to specified media content and employs the certificate and occurs after a specific interaction between a client application and the DRM client module, the client application receiving in response to the DRM license request a DRM license corresponding to the specified media content, the DRM client module deriving a content key from the DRM license, and, playing of the specified media content by employing the content key.

In another embodiment, the present disclosure provides for a system for digital rights management of licensed media content, the system comprising a client application and a DRM client module, in which the client application is configured to: be provisioned with a unique client certificate, invoke the DRM client module to store the certificate, issue a DRM license request that corresponds to specified media content and employs the certificate and occurs after a specific interaction between a client application and the DRM client module, receive a first DRM license and additional DRM licenses respectively corresponding to the specified media content and additional media content, and initiate play of the specified media content; in which the DRM client module is configured to derive a content key from the first digital rights management license, and, in which play of the specified media content employs the content key.

BRIEF DESCRIPTION OF THE DRAWINGS

Further details of the present invention are explained with the help of the attached drawings in which:
FIG. 5 depicts Hosted DRM system processing for: Content key and rights information
FIG. 8A depicts a use case for license acquisition
FIG. 9 depicts a use case for: Play Streaming content: iOS

DETAILED DESCRIPTION

Figure 1:
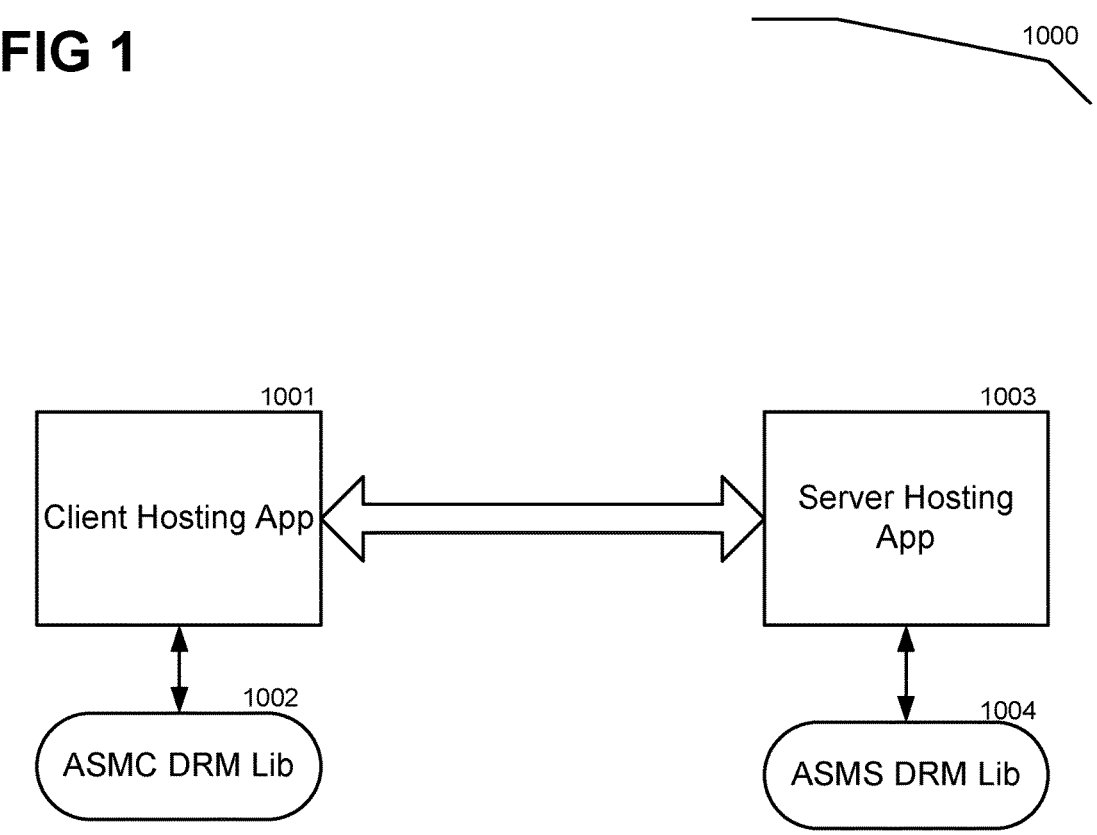
FIG. 1 depicts a content delivery ecosystem
Figure 2:
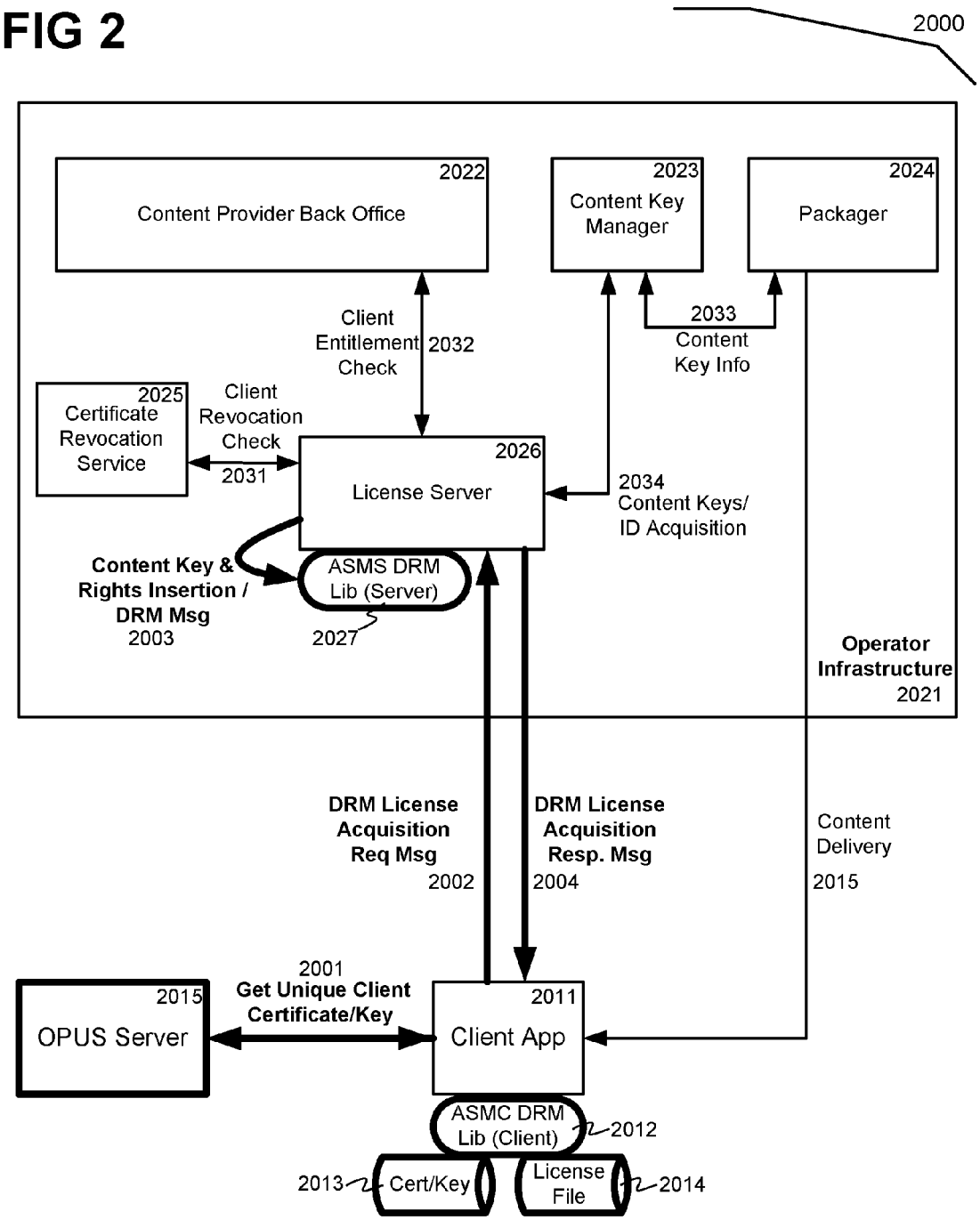
FIG. 2 depicts a Hosted DRM system
Figure 3:
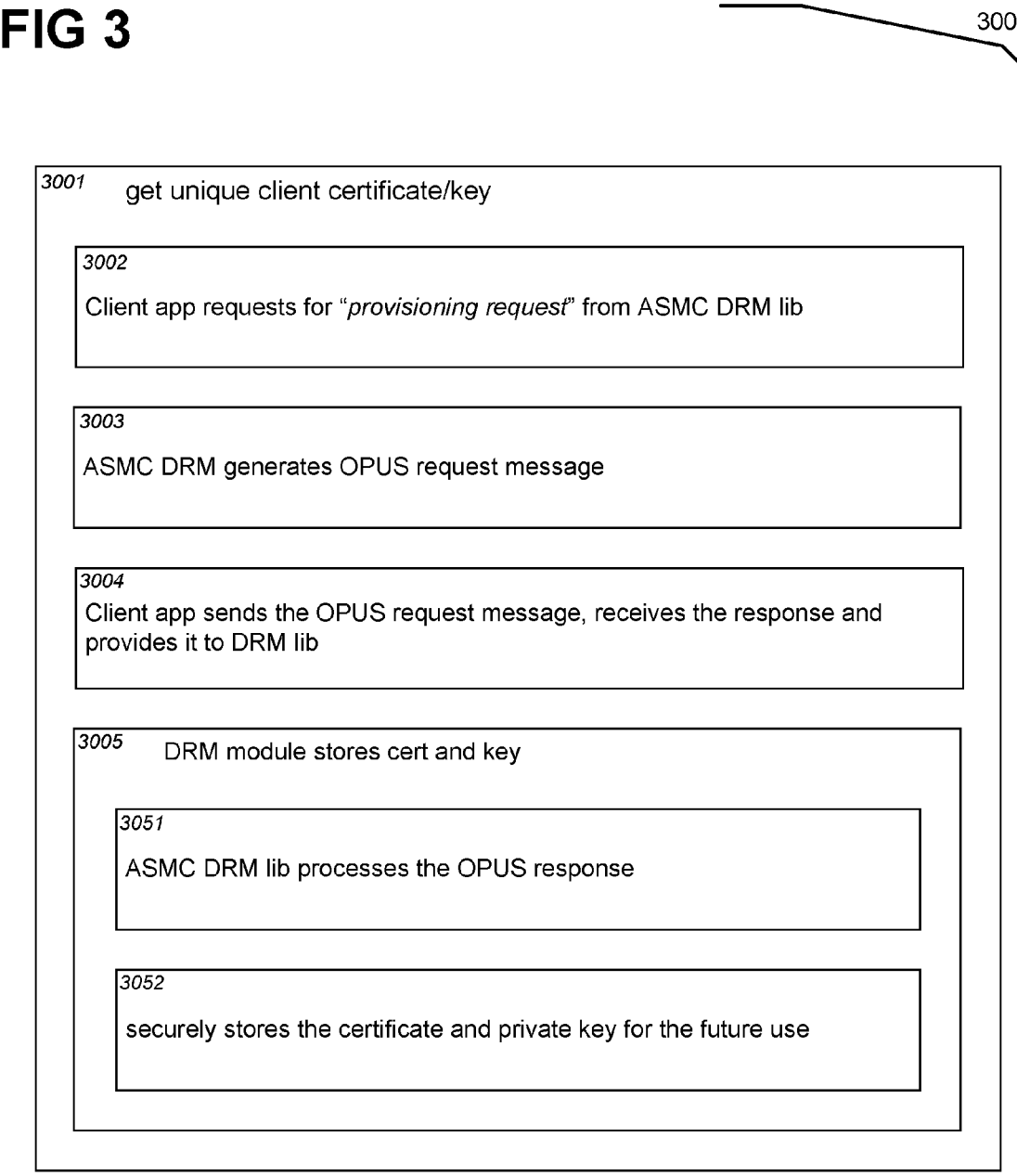
FIG. 3 depicts Hosted DRM system processing for: get unique client certificate/key
Figure 4:
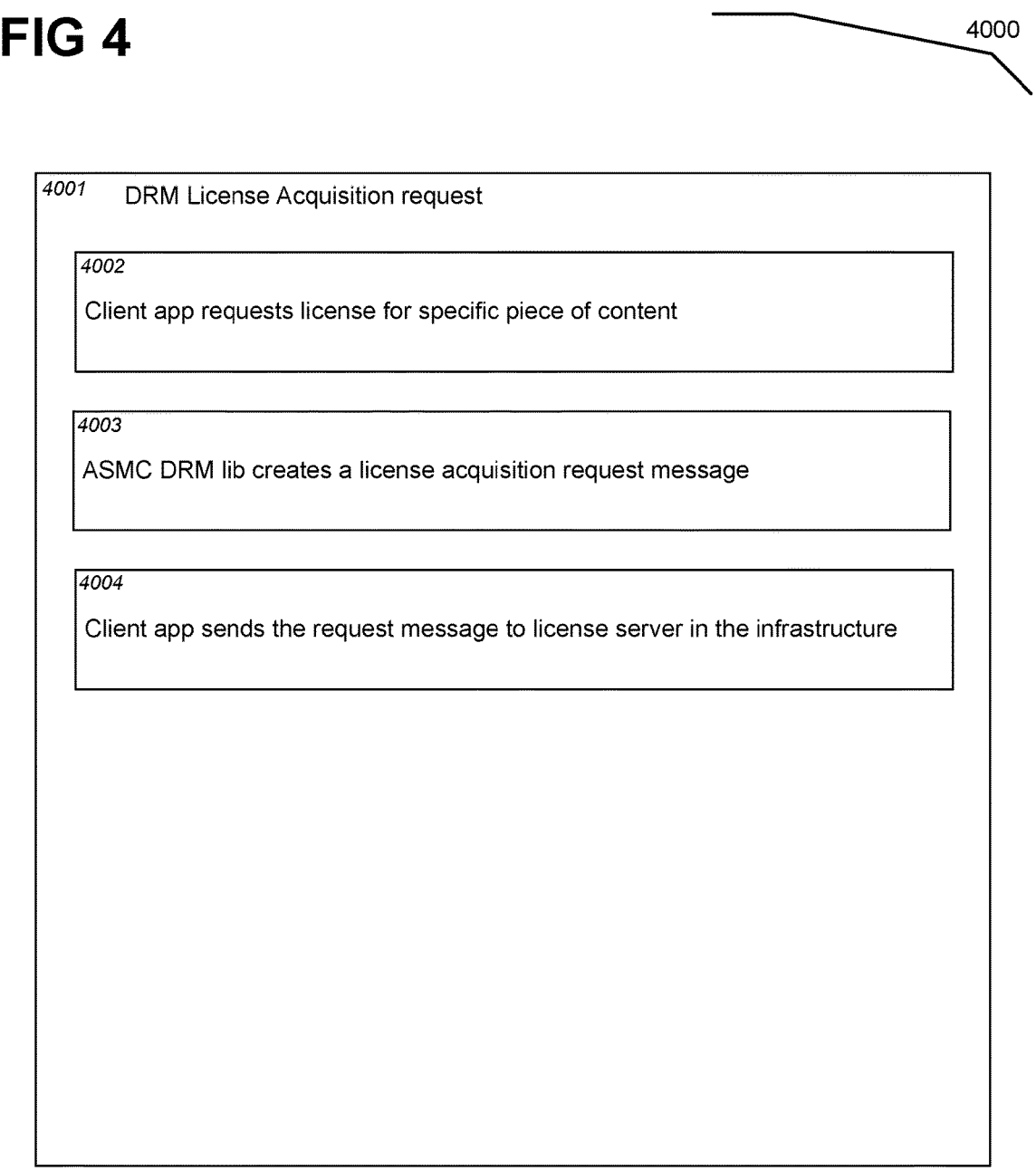
FIG. 4 depicts Hosted DRM system processing for: DRM license acquisition request
Figure 6:
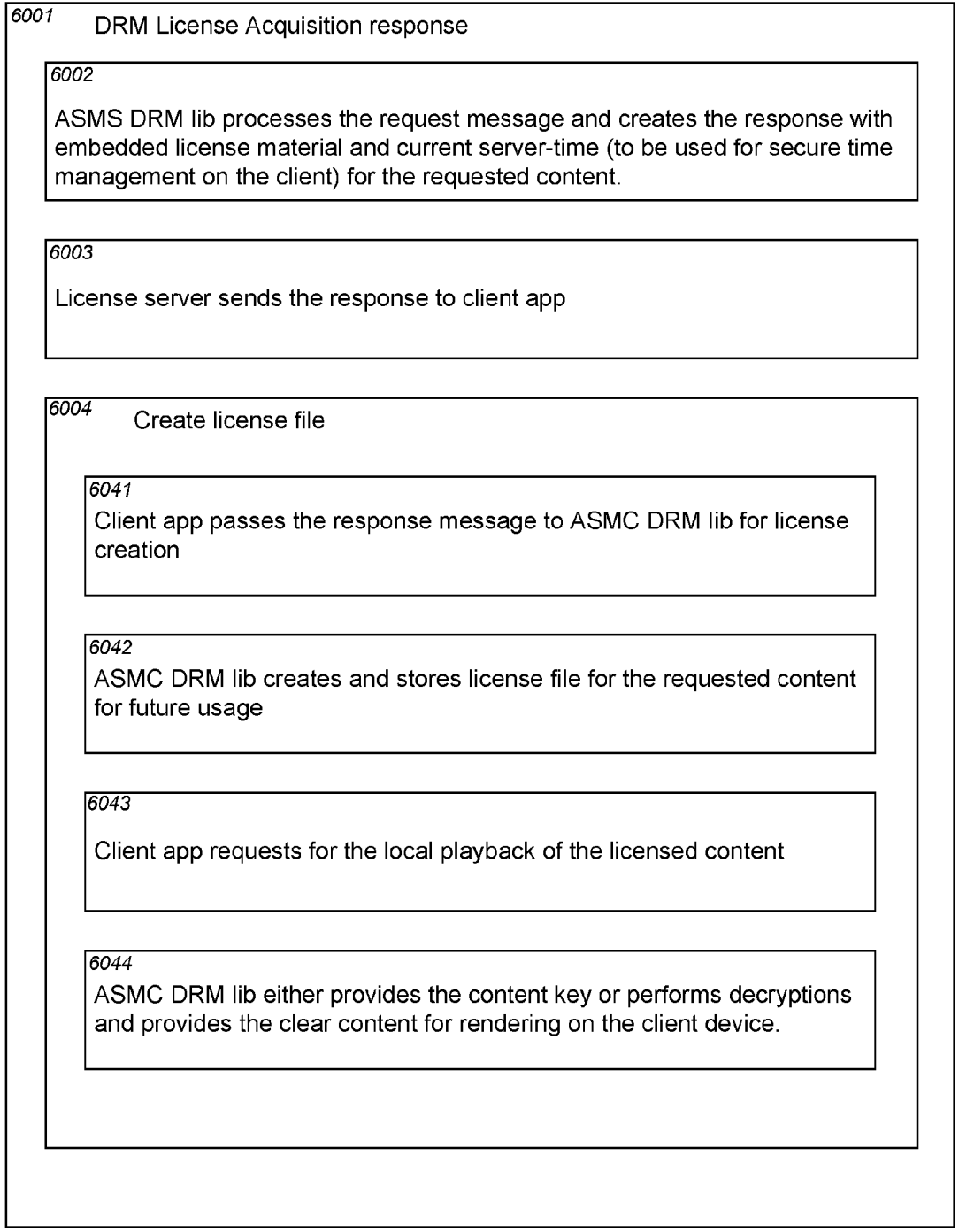
FIG. 6 depicts Hosted DRM system processing for: DRM license acquisition response
Figure 7:
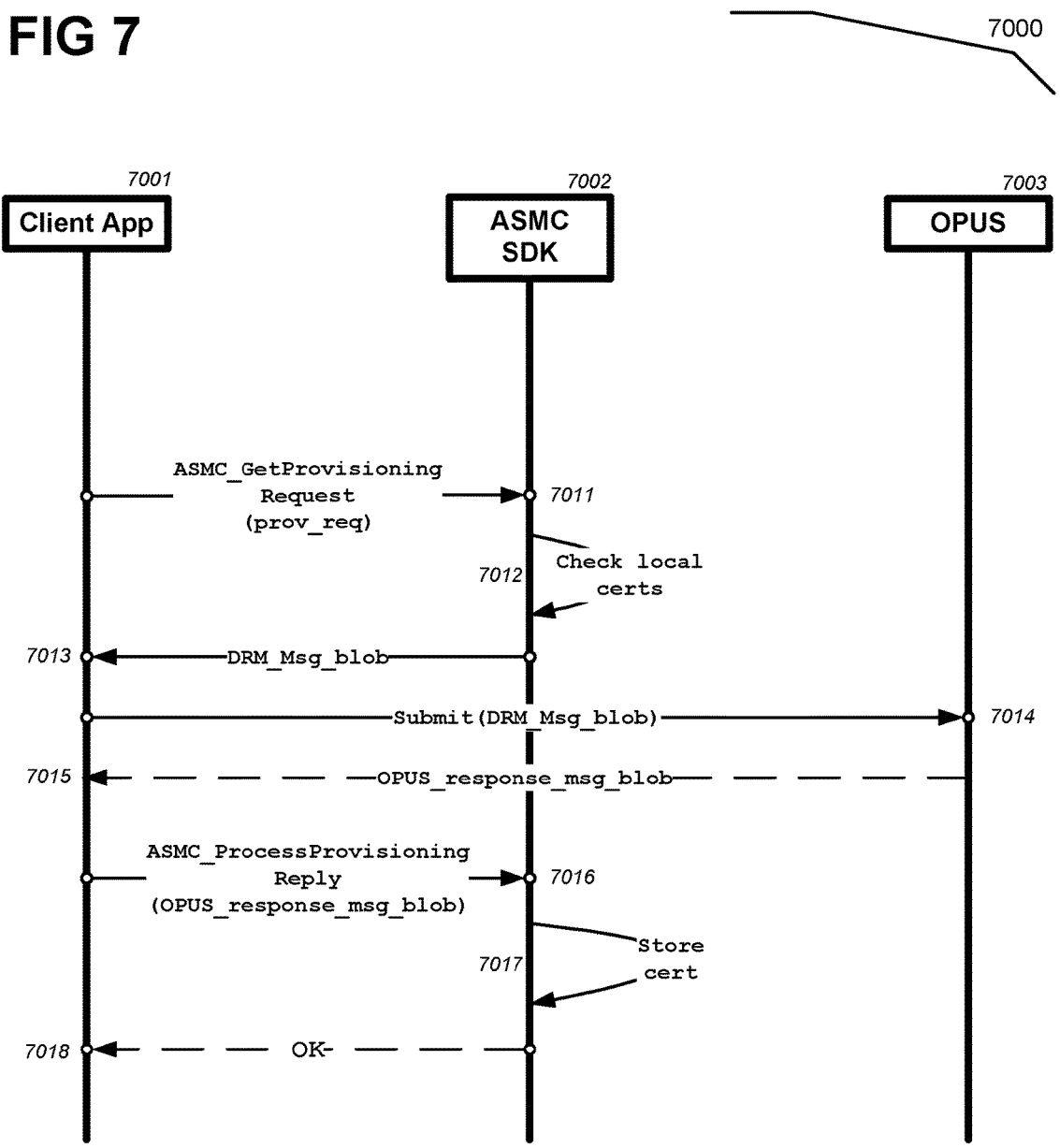
FIG. 7 depicts a use case for: provisioning a device
Figure 8B:
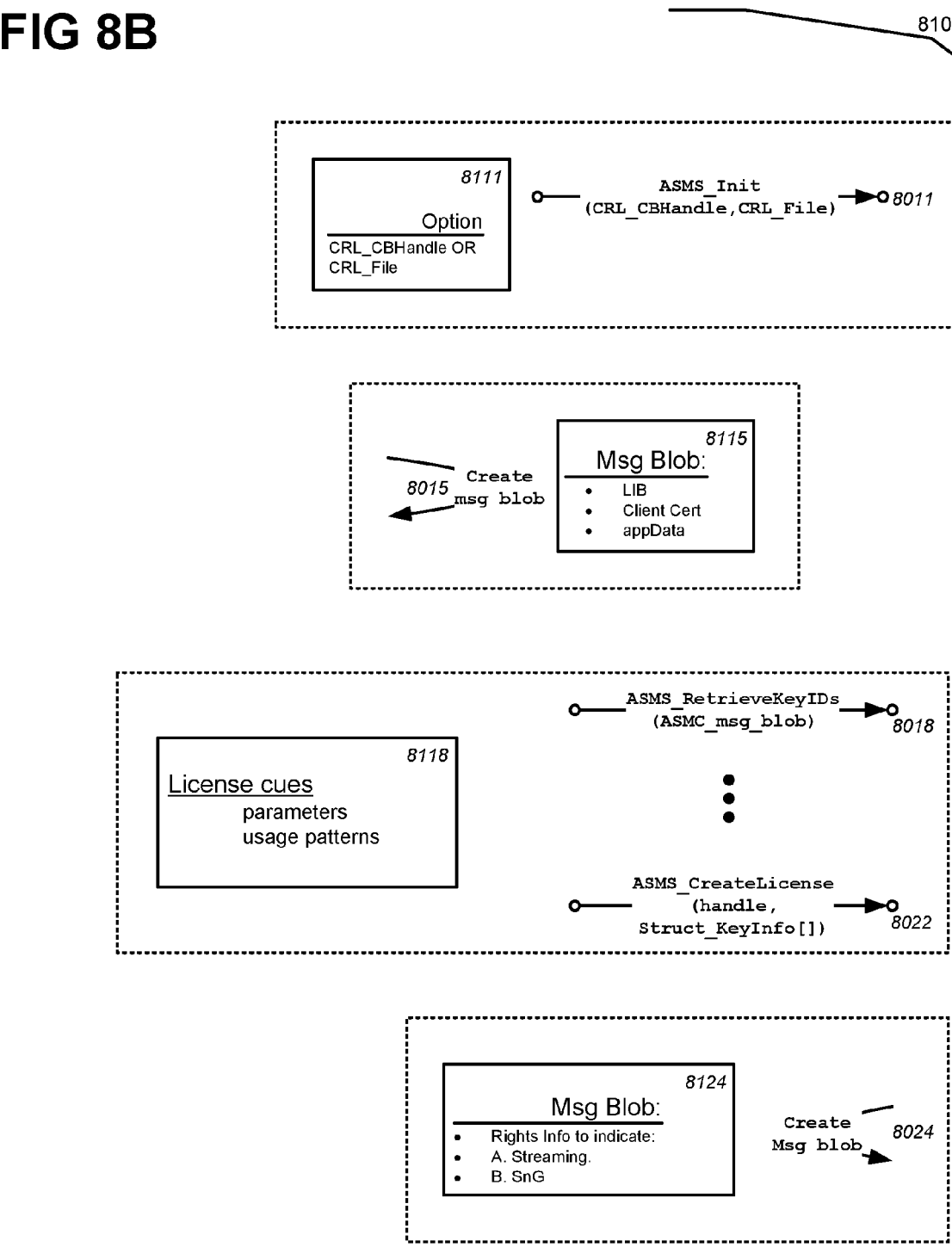
FIG. 8B depicts a use case for: license acquisition, detail
Figure 10:
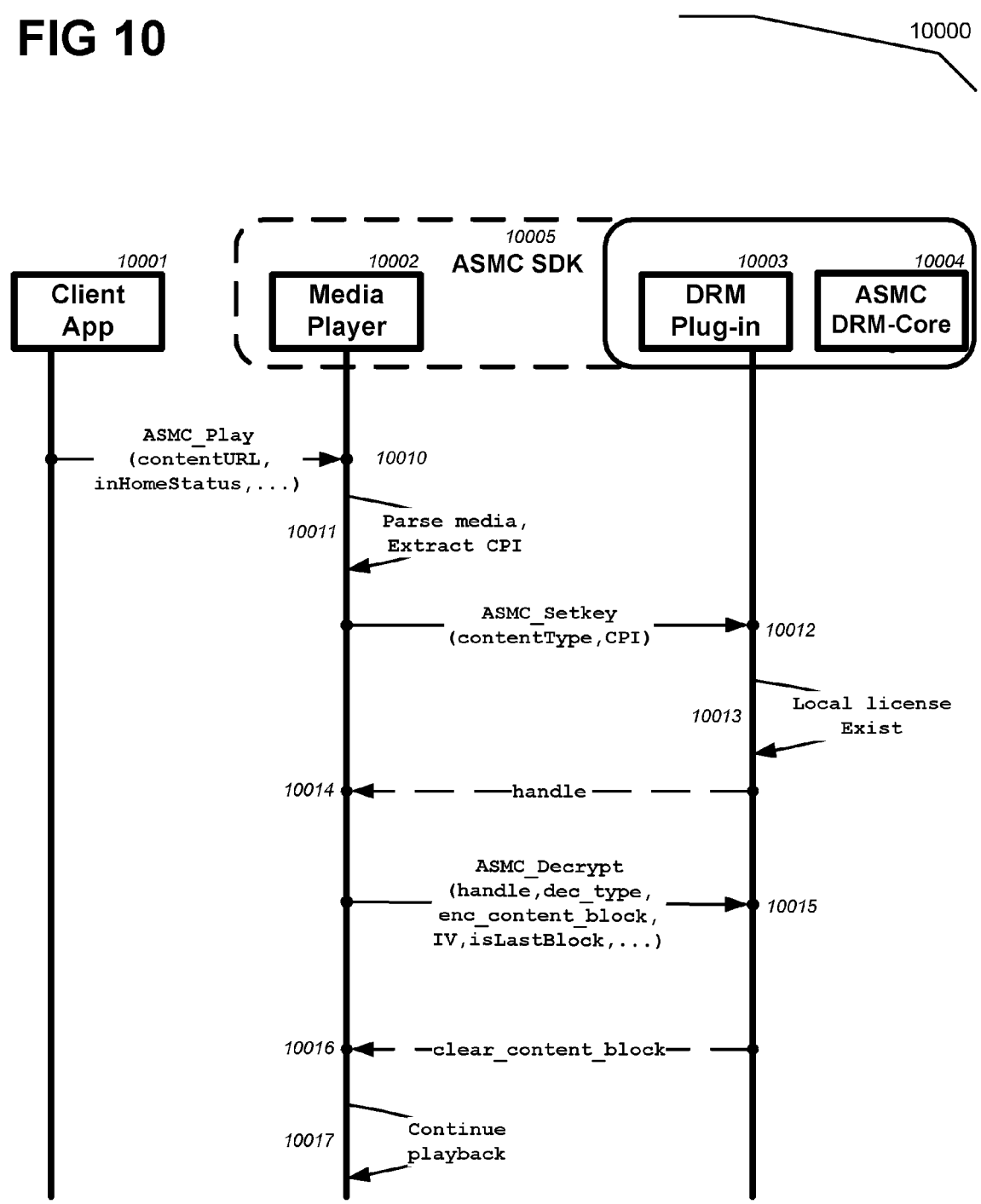
FIG. 10 depicts a use case for: Play Streaming content: Android, PC and MAC
Figure 11:
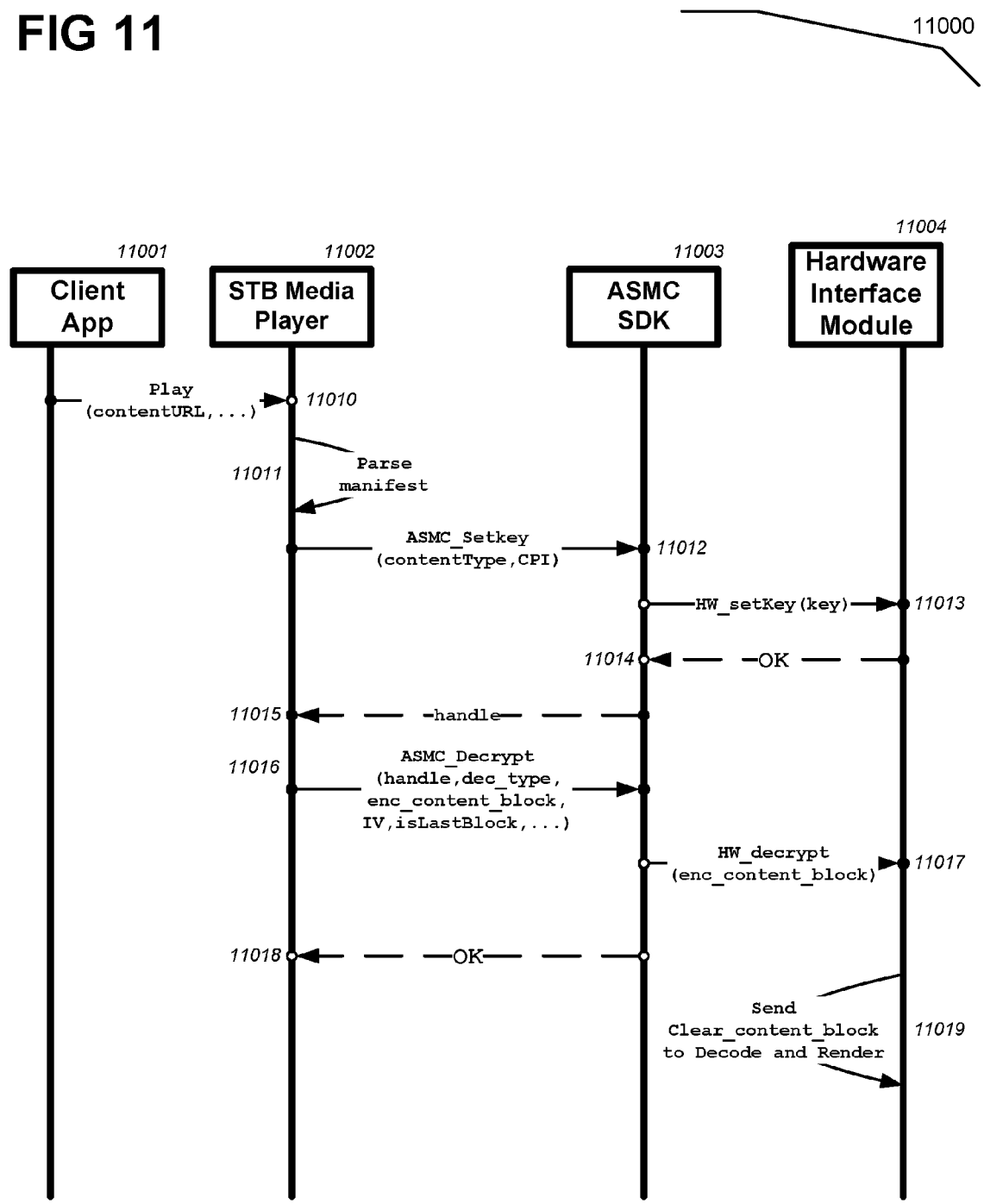
FIG. 11 depicts a use case for: Play Streaming content: Set-top Boxes (STBs)
Figure 12:
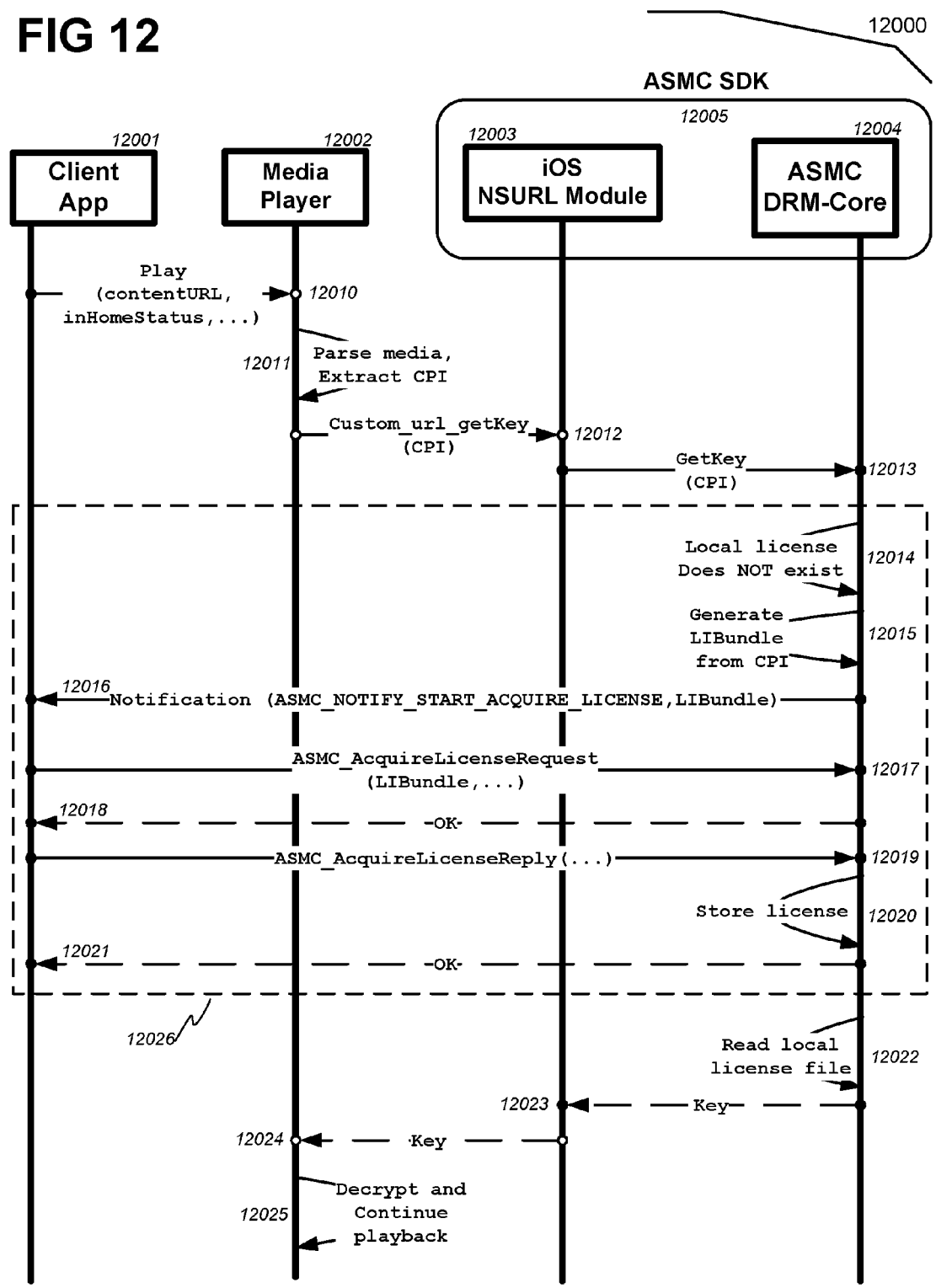
FIG. 12 depicts a use case for: Initiate acquiring license
Figure 13:
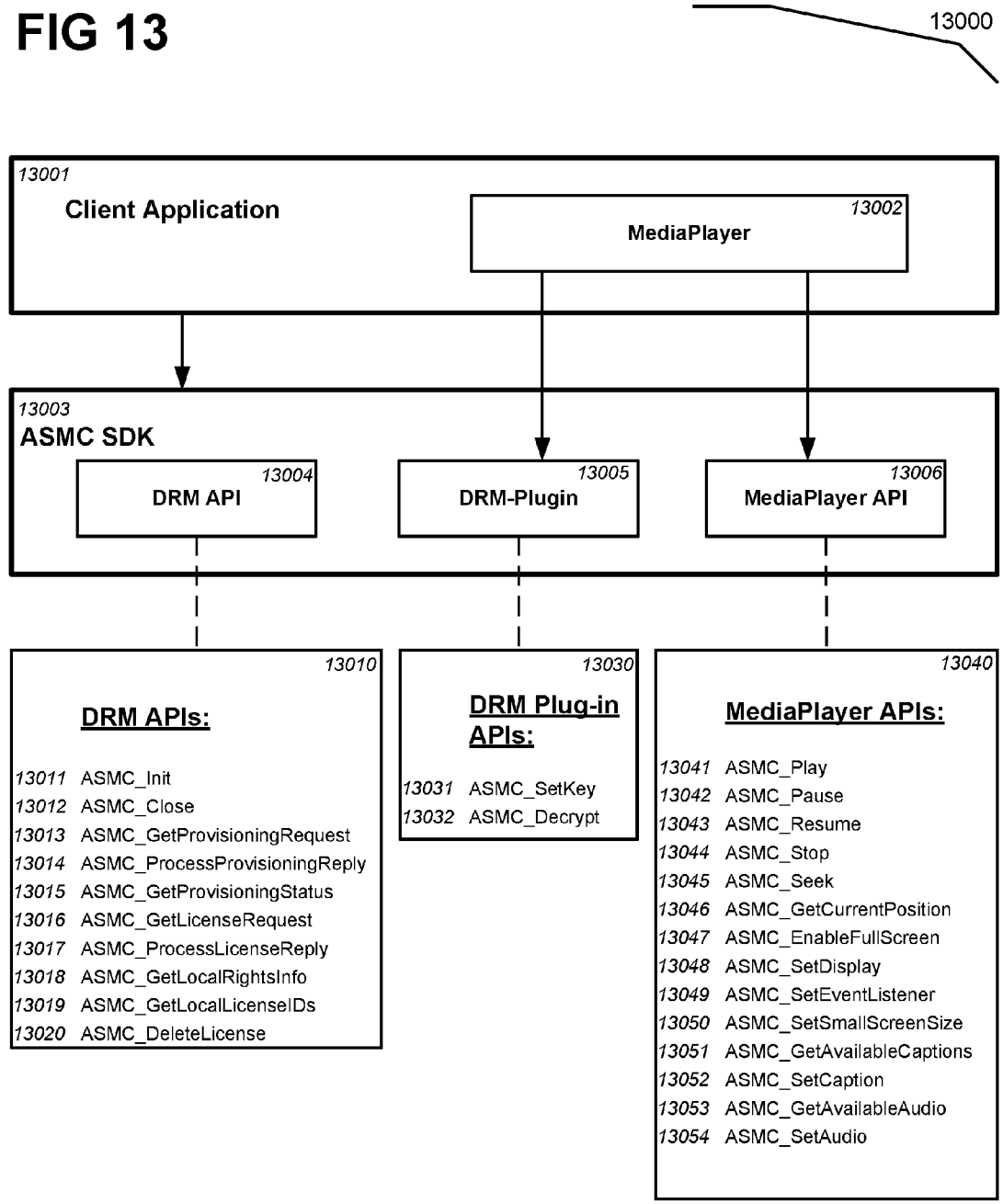
FIG. 13 depicts a client API Overview
Figure 14:
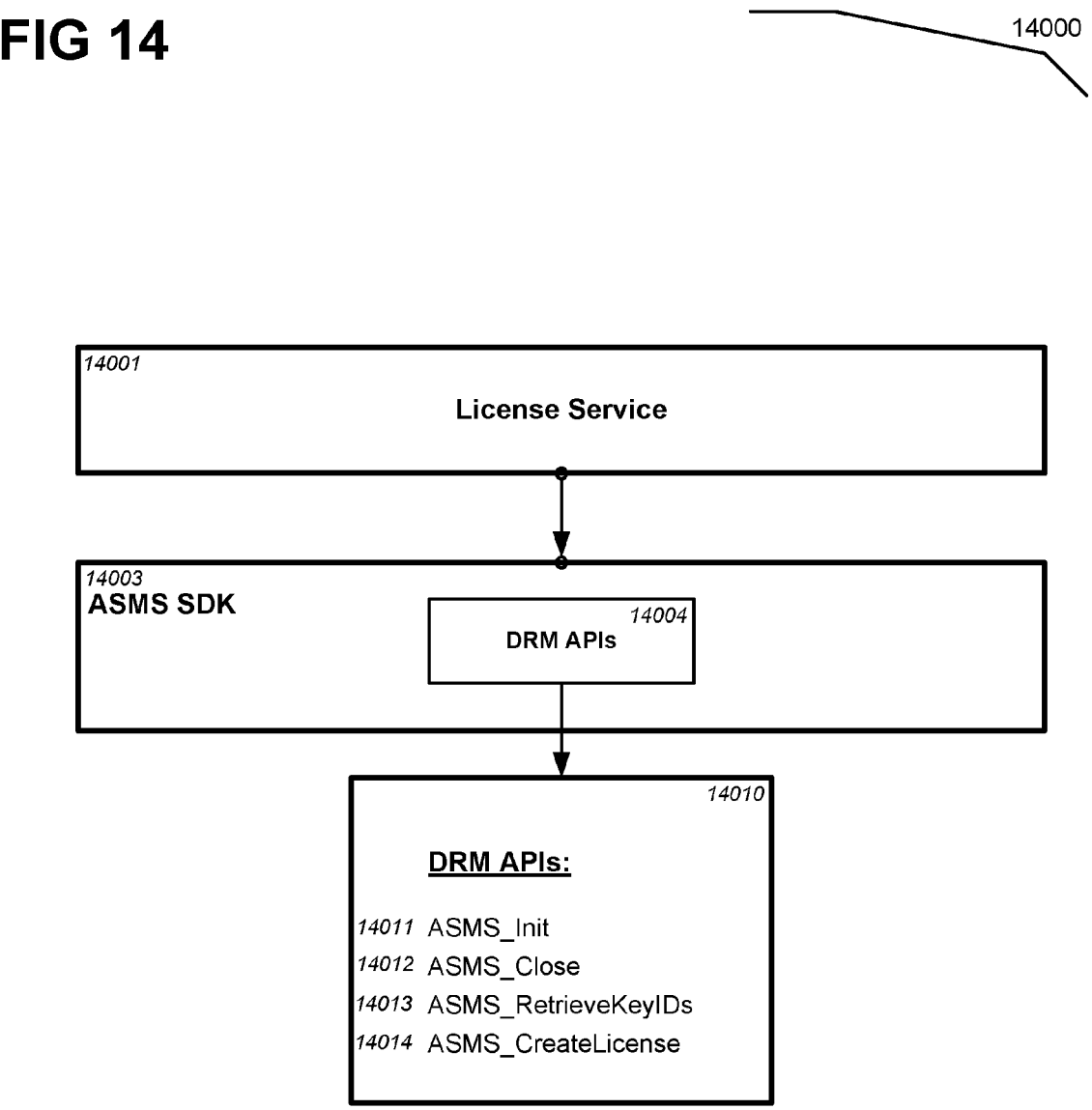
FIG. 14 depicts a server API Overview

The ARRIS SecureMedia (ASM) Software Development Kit (SDK) can provide access to a collection of client and server services. These services enable the integration of Digital Rights Management (DRM) services with client and server applications. Employing ASM client and server Application Programming Interfaces (APIs), client applications can provide for delivery of DRM licensed media content to authorized devices securely, and on a variety of platforms.

Details of ARRIS SecureMedia Client (ASMC) and Server (ASMS) components are herein described, as they fit into a content delivery ecosystem, depicted in diagram 1000. The descriptions comprise use cases and APIs exposed by client and server libraries. Some functions are defined from the application (app) perspective, as the "caller" of the services exposed by the SDK APIs.

Client and server SDKs each comprise passive library modules that can be used by a hosting application. Notably, in some embodiments, such modules do not employ out of band network access and thus do not directly exchange messages. That is, the modules function essentially absent direct communication, such as that employing a transport layer. In described embodiments, DRM transactions can be created as message blocks by DRM components, and carried by the hosting application to the other party as depicted in diagram 1000.

A client hosting application 1001 can access ASMC DRM library 1002 components and hence their functionality by invoking client APIs. A server-side hosting application 1003 can access SMCS DRM library 1004 components and hence their functionality by invoking server APIs. Communications between DRM components 1002 1004 can be accomplished through the corresponding hosting applications 1001 1003.

Client hosting application 1001 can be described as a hierarchically superior application HSA, and particularly so with respect to ASMC DRM Library 1002. Server hosting application 1003 can be described as a hierarchically superior application HSA, and particularly so with respect to ASMS DRM Library 1004. Herein, a client hosting application 1001 can be alternatively referred to as a client application or client app. Herein, a server hosting application 1003 can be alternatively referred to as a server application or server app.

A client application interface with ARRIS Client DRM module (ASMC), client media player interface with ASMC module, and infrastructure component License Server interface with ARRIS Server DRM module (ASMS) are specified herein.

Some acronyms employed in the descriptions herein comprise:

| Acronym | Description |
| --- | --- |
| API | Application Programming Interface |
| ASM | ARRIS SecureMedia |
| ASMC SDK | ARRIS SecureMedia Client SDK |
| ASMS SDK | ARRIS SecureMedia Server SDK |
| HLS | HTTP Live Streaming |
| DRM | Digital Rights Management |
| LKGT | Last Known Good Time |
| OPUS | Online Personalization Update Server |
| SDK | Software Development Kit |
| ECM | Entitlement Control Message |
| STB | Set Top Box |
| TEE | Trusted Execution Environment |
| URL | Uniform Resource Locator |
| CPI | Content Protection Information |
| LIBundle or LIB | License Identification Bundle |
| LII | License Identification Information |

A License Identification Bundle (LIB) can be used in license request generation. A LIB structure can contain one or more License Identification Information (LII). A LIB can be used by a client app in conjunction with a DRM key-system in order to fetch licenses required for access to specific content. LIB can be built by the infrastructure during content packaging, as defined within the scope of the DRM key-system.

A License Identification Information (LII) can serve as a provider domain unique identifier. A LII can unambiguously point to license information corresponding to specified content. Such license information can be required in order to render content.

A License structure can comprise content rights, key, and/or any associated content metadata. A specific piece of content can have multiple associated licenses.

Content Protection Information (CPI) can point to a license that is required in order to render a specified content and/or content component. The CPI can be delivered in band (e.g. in a MPEG Part-12 file, and/or a DASH transport stream, and/or a transport stream ECM). The CPI can be delivered out of band (e.g. in the HLS playlist an d/or DASH MPD). CPI can be employed by ASMC_SetKey API.

Within the descriptions herein, individual functions and elements are alternatively described as steps and/or functions.

Within the descriptions herein, "playback" can encompass play of stored media and play of streamed media and play of any other known and/or convenient forms of media. Thus "playback" is not restricted to 'playing back.' Such "playback" can alternatively be described as "play" and "playing."

Diagram 2000 depicts DRM SDK libraries in an example hosted system. Within an operator infrastructure 2021 a License Server 2026 hosts server-side ASMS DRM library modules 2027. A client application 2011 hosts client-side ASMC DRM library modules 2012. ASMC DRM library modules can locally utilize certificates and keys 2013 and license files 2014. Client application 2011 can interact with online personalization update server, OPUS Server 2015. for access to client certificates and keys. A packager 2024 within the operator infrastructure 2021 can provide content delivery 2015 for the client application 2011.

Notable Arris DRM-related transactions are shown in the diagram 2000 and further illustrated and described in diagrams 3000 4000 5000 6000. Client application 2011 can interact with OPUS server 2015 to "Get Unique Client Certificate/Key" 2001. Client application 2011 can issue a request for a DRM license to License Server 2026 with "DRM License Acquisition Req Msg" 2002. License Server 2026 can provide a corresponding response by "DRM License Acquisition Resp. Msg" 2004. License Server 2026 can provide a request, content key, and rights information to the ASMS DRM library 2027 modules by "Content Key & Rights Insertion/DRM Msg" 2003.

Content Provider Back Office 2022 can be provided by a content provider. It can determine and provide appropriate granting of access (entitlement) to a client device for a specific content.

Content Key Manager 2023 can be provided by a content provider. It can create and/or manage content encryption key(s) CEK that can be required for encryption and/or decryption of content. Such content can comprise audio, video, and/or any other known and/or convenient content.

Packager 2024 can be provided by a content provider. It can provide content suitable for consumption on a client device by performing a variety of functions. Such functions can comprise encrypting audio and/or video tracks, encoding content at various bit rates and/or at various resolutions, and packaging protected content into various media file formats. In some embodiments, packaged content can be made available to client devices over a Content Distribution Network.

Certificate Revocation Service 2025 can be provided by a content provider. It can provide a Certificate Revocation List CRL. The CRL can provide a list of blacklisted client certificates. In some embodiments such blacklisted client certificates can be revoked and/or denied access to the system.

In element Client Revocation Check 2031, a License Server 2026 can obtain a CRL. License Server 2026 can determine a blacklisted status for a client device that requests a content license.

Element Client Entitlement Check 2032 can be invoked upon a client device request for a content license. License Server 2026 can engage with Back Office 2022 to determine appropriate access corresponding to a specific consumer and specific selected content.

As Packager 2024 prepares content, it can request corresponding Content Key Info 2033 from Content Key Manager 2023. Such Content Key Info 2033 can comprise content key information and metadata elements. Packager 2024 can provide content manifest files that comprise those elements. In some embodiments, a client DRM component can employ such content key information and metadata in requesting a content license for access and/or playback of the corresponding content.

In the descriptions herein, "transaction" can identify embodiments that provide one or more distinct DRM services. Such a service, by way of non-limiting examples, can be provisioning a device, license acquisition, playing of content, and/or initiating license acquisition. A transaction can comprise another transaction. A transaction can comprise numerous interactions between system elements, and numerous steps.

In the descriptions herein, an "interaction" can comprise embodiments in which components interact. By way of non-limiting examples, such interactions can comprise an individual step such as a data transmission between client and server applications, and/or, a multi-step operation such as a message exchange between components such as client and server applications and client and server library components. An interaction can comprise numerous steps.

Diagram 3000 depicts details of an embodiment of "Get Unique Client Certificate/Key" 2001, corresponding to step 3001 "get unique client certificate/key" which can comprise further steps.

In step 3002 (of step 3001), a client app 2011 can issue a request for a "provisioning request" from ASMC DRM library 2012.

In step 3003 (of step 3001), ASMC DRM modules can generate an OPUS request message.

In step 3004 (of step 3001), the client app can send the OPUS request message to OPUS Server 2015, receive a corresponding response, and provide the response to the ASMC DRM library modules.

In step 3005 (of step 3001), which can comprise further steps, ASMC DRM modules can store certificates and keys.

In step 3051 (of step 3005), ASMC DRM modules can process the OPUS response.

In step 3052 (of step 3005), ASMC DRM modules can securely store a certificate and a private key. In some embodiments, stored certificates and keys can be employed in future, that is, in later-occurring transactions and/or processes.

Diagram 4000 depicts details of an embodiment of "DRM License Acquisition Req Msg" 2002, corresponding to step 4001 "DRM License Acquisition request" which can comprise further steps.

In step 4002 (of 4001), a client app can request a license for a specific piece of content.

In step 4003 (of 4001), ASMC DRM modules can create a license acquisition request message.

In step 4004 (of 4001), the client app can send the license acquisition request message to a license server 2026.

Diagram 5000 depicts details of an embodiment for "Content Key and Rights Information" 5001, some steps of which correspond to of "Content Key & Rights Insertion/DRM Msg" 2003. Step 5001 "Content Key and Rights Information" can comprise further steps.

In step 5002 (of 5001), License Server 2026 can perform an authorization check for requested content. Such an authorization check can correspond to "Client Entitlement Check" 2032 and can comprise interactions with a back office server database, such as "Content Provider Back Office" 2022.

In step 5003 (of 5001), a license server 2026 can provide the request DRM message, content key and rights information to ASMS DRM modules 2027.

Diagram 6000 depicts details of an embodiment for "DRM License Acquisition response" 6001, some steps of which correspond to of "DRM License Acquisition Resp. Msg" 2004. Step 6001 "Content Key and Rights Information" can comprise further steps.

In step 6002 (of 6001), ASMS DRM modules can process the request message and creates a response. The response can comprise embedded license material and current server-time for the requested content. In some embodiments, the provided current server-time can be employed for secure time management on a client.

In step 6003 (of 6001), a license server such as License Server 2026 can send the response to a client app 2011.

In step 6004 (of 6001), ASMS DRM modules can create a license file. Step 6004 can comprise further steps.

In step 6041 (of 6004), a client app 2011 can pass the response message to ASMC DRM modules 2012 for license creation.

In step 6042 (of 6004), ASMC DRM modules can create and store a license file 2014 corresponding to the requested content. The license file can be stored for future usage.

In step 6043 (of 6004), a client app 2011 can request local playback of the licensed content.

In step 6044 (of 6004), ASMC DRM modules can provide a content key corresponding to the requested content. Thus a client device can employ the key to render the content. Alternatively, ASMC DRM modules can perform decryptions and provide clear content. Thus a client device can employ the clear content to render the content.

Assumptions and Requirements:

Some system embodiments can operate under the following assumptions and/or requirements:

1. The ASMS DRM module (server side) shall not require any persistent database.

2. The ASMC DRM module (client side) does not have access to the IP transport layer (Eg: cannot communicate with other modules over the network). The application layer shall manage transport of DRM messages between ASM DRM client and ASM DRM server modules.

3. The client application can invoke the ASMC DRM module to "request license" upon making a service choice.

4. The Media player module can receive content with Content Protection Information (CPI). The CIP can be a keytag or an ECM equivalent. The keytag can inform the ASMC DRM module of a specific license ID in use, and can provide related DRM specific information. Each new reception of CPI, inherently referencing a content key, can cause the player to send that CPI to its decryption component. Decryption components can comprise software plug-ins, NSURL, and/or CDM. This plug-in (hardware or software) can extract any relevant information, such as the IV. The plug-in can act as an interface, and send a key request to the DRM library. The DRM library can send the resulting key to the plug-in in a client platform dependent manner. This can ensures that a client application will not have access to the content key. The plug-in dependent interface can allow for the usage of NSURL for Apple iOS clients, an obfuscated DRM decryption plug-in for Android software players, and/or hardware related solutions for TEE architectures and STBs.

Software Components

Some embodiments of the ARRIS DRM system comprise libraries with defined interfaces in C and Java. In some embodiments, there is essentially no transport layer built in to these library components. They can rely solely on the application layer to send and receive DRM messages between the DRM client library and DRM server library. The ASMS DRM library can be optimized to maintain client authentication and registration data in a session, for any future (limited duration) usage; however, it doesn't require any database or persistent data storage. In some embodiments, the ASMC DRM client side libraries are available in a variety of specific environments and/or platforms. Such environments can comprise iOS, Android, Mac and/or Windows platforms. In some embodiments, an ASMS DRM server side library is available for Linux.

Diagram 7000 illustrates a use case for provisioning a client device. A client device can be provisioned in order to access secure content from a server.

In step 7011 client app 7001 calls and ASMC SDK 7002 receives ASMC_GetProvisioning Request(prov_req).

In step 7012 ASMC SDK 7002 checks local cuts.

In step 7013 ASMC SDK 7002 provides and client app 7001 receives DRM_Msg_blob.

In step 7014 client app 7001 submits and OPUS 7003 receives DRM_Msg_blob.

In step 7015 OPUS 7003 provides and client app receives 7001 OPUS_response_msg_blob.

In step 7016 client app 7001 calls and ASMC SDK 7002 receives ASMC_ProcessProvisioning Reply(OPUS_response_msg_blob).

In step 7017 ASMC SDK 7002 stores certificates.

In step 7018 ASMC SDK 7002 provides and client app 7001 receives OK.

Diagrams 8000 and 8100 depict a use case for acquiring a license, that is, license acquisition. A client application can acquire a license prior to playing a specific content.

In step 8010, client app 8001 acquires LIBundle.

In step 8011 server app 8003 calls ASMS_Init(CRL_CBHandle,CRL_File) in order to initialize the overall DRM system. The call is received by ASMS SDK 8004.

In diagram 8100, element 8111 depicts further detail of step 8011. ASMS_Init can be called with either of the call-back handle "CRL_CBHandle" or the file "CRL_File," corresponding to a certificate revocation list. In step 8012 ASMS SDK 8004 stores CRL_CBHandle or CRL_File.

In step 8013 ASMS SDK 8004 provides OK to server app 8003.

In step 8014 client app 8001 calls ASMC_GetLicenseRequest(LIBundle,appData,continueFlag, . . . ). The call is received by ASMC SDK 8002.

In step 8015 ASMC SDK 8002 creates a message blob "msg blob." Object 8124 can serve to identify media content. In some embodiments, a message blob can be a data object that can be made opaque through cryptographic methods.

In diagram 8100, element 8115 depicts further detail of the message blob created in step 8015. The message blob can comprise a License Identification Bundle, a Client Certificate, and/or appData such as In_appData as herein described regarding ASMC_GetLicenseRequest.

In step 8016 ASMC SDK 8002 provides and client app 8001 receives ASMC_msg_blob.

In step 8017 client app 8001 provides and server app 8003 receives ASMC_msg_blob. In steps 8018 through 8022, server app 8003 can proactively generate license requests and hence licenses. That is, server app 8003 receives some specified license information within ASMC_msg_blog of step 8017. In further steps 8018 through 8022, server app 8003 can perform steps and/or transactions advocating for additional licenses. Server app can provide specific identifying information corresponding to the additional licenses. This identifying information can be responsive to license cues 8118, depicted in diagram 8100. Such cues can comprise parameters and/or usage patterns to which the server app 8003 has access. In some embodiments, a server app can develop and/or manage such cues. In some embodiments the cues can further comprise any known and/or additional structures and methods as are suitable to the purpose.

In step 8018 server app 8003 calls and ASMS SDK 8004 receives ASMS_RetrieveKeyIDs(ASMC_msg_blob). ASMS_RetrieveKeyIDs retrieves a list of key IDs from the ASMC_msg_blob.

In step 8019 ASMS SDK 8004 provides and server app 8003 receives "handle, keyIDs[ ]." That is, the server app 8003 receives a list of key IDs "keyIDs[ ]" and the corresponding DRM handle.

Step 8020 depicts server app 8003 checking entitlements corresponding to a particular device with "Check Entitlements (deviceID)."

Step 8021 depicts server app 8003 getting keys and rights with "Get keys, rights . . . "

In step 8022 server app 8003 calls and ASMS SDK 8004 receives ASMS_CreateLicense(handle, Struct_KeyInfo[ ]).

In step 8023 ASMS SDK 8004 provides CRL callback OR Check CRL_File, corresponding to the selected option of step 8011 ASMS_Init.

In step 8024 ASMS SDK 8004 creates message blob "msg blob."

In diagram 8100, element 8124 depicts further detail of the message blob created in step 8024. The message blob 8124 can comprise rights information corresponding to streaming and/or SnG.

In step 8025 ASMS SDK 8004 provides and server app 8003 receives ASMS_msg_blob.

In step 8026 server app 8003 provides and client app 8001 receives ASMS_msg_blob.

In step 8027 client app 8001 calls and ASMC SDK 8002 receives ASMC_ProcessLicense Reply(ASMS_msg_blob).

In step 8028 ASMC SDK 8002 processes the "msg blob."

In step 8029 ASMC SDK 8002 can store one or more licenses. The licenses can comprise content keys and license information. In descriptions herein, a content key can be alternatively described as a key. In some playback scenario embodiments, such keys can be derived from the stored license or licenses. Deriving a key in such a manner can be alternatively described herein as extracting or retrieving a key. By way of non-limiting example, diagram 10000 depicts a use case for Play Streaming Content. In step 10013 of the diagram, a digital rights management client module 10003 can derive a key from a stored license.

In step 8030 ASMC SDK 8002 provides and client app 8001 receives "SUCCESS:licIDList/CONTINUE/ERROR." That is, the client app 8001 receives a status message. The status message can indicate success and provide corresponding license identification "SUCCESS:licIDList," indicate to continue processing "CONTINUE," and/or indication an error "ERROR."

In step 8031 server app 8003 calls and ASMS SDK 8004 receives ASMS_Close.

In step 8032 ASMS SDK 8004 provides and server app 8003 receives OK.

Step 8033 depicts a selectably repeatable execution loop of steps 8014 through 8030. A selection can be made responsive to the status message of step 8030.

Opaque Tunneling

Some embodiments notably comprise messaging methods that can be described as opaque tunneling, with regard to messaging between client application and server application. Opaque tunneling provides for secure communications between client and server applications. Although client and server applications can be in direct communication, there can be a need for secure messaging services that can be supported by the client and server DRM modules.

In the case of messaging from a client application to a server application, a message from the client application can be passed to client library components for encoding/encryption. The encoded/encrypted message can be returned to the client application that can directly communicate it to the server application. The server application can pass the encoded/encrypted message to the server library components for decoding/decryption. The decoded/decrypted message can finally be delivered to the server application.

Secure messaging from server application to client application can be accomplished similarly. A message starting from a server application can be passed through server library components for encoding/encryption and returned to the server application. The server application can directly communicate the message to the client application. The client application can pass the encoded/encrypted message to the client library components for decoding/decryption. The decoded/decrypted message can finally be delivered to the client application.

By way of non-limiting example, a client application to server application secure communication is depicted in diagrams 8000 and 8100, corresponding to a license acquisition process.

In response to client message ASMC_GetLicenseRequest( ) 8014, the ASMC DRM library components of ASMC SDK 8002 can generate an encoded/encrypted ASMC_msg_blob in step 8015 and provide it to the client application 8001. The 'blob' can be communicated directly to server application 8003. In turn, server app 8003 can pass the encoded message to server library components 8004 with ASMS_RetrieveKeyIDS( ) in step 8018. The server component 8004 can decode/decrypt the message and provide it to server app 8002.

In some notable embodiments, the direct client-to-server communication ASMC_msg_blob of step 8017 can take place over insecure links without compromising the secure nature of the encrypted/encoded message.

Specific interactions within the license acquisition use case depicted in diagrams 8000 and 8100 have been employed for non-limiting examples of opaque tunneling. Notably, other use cases and interactions depicted herein can comprise such methods.

Multiple Delivery Methods for License Identification Information Structures

ASMC and ASMS components support a plurality of delivery mechanisms for License Identification Information (LII). A hosting application can retrieve LII from a backend system, or, embed LII in content files. Delivery mechanisms support both license prefetching and obtaining a license at time of playback.

In diagram 8000, a LIBundle comprising LII can be obtained prior to calling ASMC_GetLicenseRequest in step 8014. In this case, a client application 8001 provides the LII. By way of examples, such an LII can be obtained from a back office entity 2022 such as depicted in diagram 2000, and/or by other customer specific information available to the client application. In this manner, a license can be 'prefetched' and thus contribute to minimizing delay for playback operations. In some embodiments, such a prefetching operation requires getting LIBundle data from a component other than an ASMC library component.

Client Application Abstraction

ASMC and ASMS components support abstraction at the client application level. In some embodiments, a relatively small number of calls from, and interactions with, the client application can deliver powerful specific DRM services comprising many interactions and steps. Diagrams 8000 and 8100 depict an exemplary embodiment of this concept in a license acquisition use case. Client app 8001 issues API calls ASMC_GetLicenseRequest in step 8014, ASMC_ProcessLicenseReply in step 8026, and selectively repeats the acquisition process per element 8033. The system provides numerous additional interactions and steps responsive to those very few direct interactions with the client application. The additional interactions and steps can comprise specific DRM services, such as license creation. License creation can specifically comprise step 8018 ASMS_RetrieveKeyIDs( ) and step 8019 that returns a handle and keys. Elements of license creation, and other interactions and steps, can be performed absent direct interactions with the client application.

Diagram 12000 corresponds to an embodiment in which a license can be obtained at the point of playback. Upon determining that a corresponding license does not exist in step 12014, a LIBundle comprising LII can be generated in step 12015. In some embodiments, such an operation for obtaining a license at the time of playback requires that the client application get LIBundle data from an ASMC component. In diagram 12000, this is depicted as step 12016 in which ASMC DRM-Core 12004 provides ASMC_Aquire-LicenseRequest(LIBundle, . . . ).

Diagram 9000 depicts a use case for playing streaming content in a specified operating system environment. The environment can be an iOS environment. In some embodiments, an iOS native HLS player can be employed for playing streaming content. In some embodiments, a CPI of #EXT-X-KEY tag corresponds to HLS content type.

In step 9010 NSURL module 9003 invokes Register Custom_protocol. In some embodiments, a custom protocol such as "asm://" can be registered.

In step 9011 client app 9001 calls and media player 9002 receives Play(contentURL,inHomeStatus, . . . )

In step 9012 media player 9002 parses media in order to extract CPI "Parse media, Extract CPI."

In step 9013 media player 9002 provides and NSURL module 9003 receives getKey_custom_protocol(CPI).

In step 9014 NSURL module 9003 and ASMC DRM-Core 9004 receives "GetKey( . . . )."

In step 9015 ASMC DRM-Core 9004 invokes "Read local License(exist)."

In step 9016 ASMC DRM-Core 9004 provides and NSURL module 9003 receives a key "Key."

In step 9017 NSURL module 9003 provides and media player 9002 receives a "Key."

In step 9018 media player 9002 can "Decrypt and Continue playback."

Diagram 10000 depicts a use case for Play Streaming content corresponding to a variety of operating system environments. Such environments can comprise Android, PC, and MAC environments. Such operating system environments can alternatively be described as platforms.

A software media player can support an obfuscated DRM decryption plug-in, in order to play streaming content on Android, PC and Mac platforms. In a "most secure" software implementation embodiment, a media player can be provided as part of the ASMC SDK.

Some embodiments of PC and Mac implementations can be browser based solutions. In such cases, APIs can be advantageously provided in JavaScript. Such implementations can be advantageously compatible with Microsoft ActiveX, NPAPI Plugins and/or Google PNaCl environments.

Diagram 10000 depicts ASMC SDK 10005 with a dotted line surrounding the Media Player 10002. The dotted line depicts that in some embodiments, it can be desirable and/or advantageous to have the Media Player 10002 and the DRM Plug-in 10003 disposed within the same "secure sandbox."

In step 10010 client app 10001 calls and media player receives 10002 ASMC_Play(contentURL,inHome Status, . . . ).

In step 10011 media player 10002 parses media in order to extract CPI, depicted as "Parse media, Extract CPI."

In step 10012 media player 10002 calls and DRM plug-in 10003 receives ASMC_Setkey(contentType,CPI).

In step 10013 DRM plug-in 10003 invokes "local license Exist." In this step 10013 a digital rights management client module 10003 can derive a key from a stored license. This step 10013 can be employed in determining whether or not a local license exists for content corresponding to a specific request. Additional embodiments herein comprise steps in which a digital rights management client module can derive a key from a stored license.

In step 10014 DRM plug-in 10003 provides and media player 10002 receives "handle."

In step 10015 media player 10002 calls and DRM plug-in 10003 receives ASMC_Decrypt(handle,dec_type, enc_content_block,IV,isLastBlock, . . . ).

In step 10016 DRM plug-in 10003 provides and media player 10002 receives "clear_content_block."

In step 10017 media player 10002 continues playback.

Diagram 11000 depicts a use case for Play Streaming content corresponding to a Set Top Box environment. In some embodiments, a Set Top Box environment can be characterized as comprising one or more application- and/or vendor-specific hardware elements that support specific functionalities.

In some embodiments, ASMC SDK module 11003 can execute within a TEE (trusted execution environment). In some such embodiments, a protected video-path can be provided in hardware.

In step 11010 client app 11001 calls and STB media player 11002 receives Play(contentURL, . . . ).

In step 11011 STB media player 11002 parses a manifest.

In step 11012 STB media player 11002 calls and ASMC SDK 11003 receives ASMC_Setkey(contentType,CPI).

In step 11013 ASMC SDK 11003 provides and Hardware Interface Module 11004 receives "HW_setKey(key)."

In step 11014 Hardware Interface Module 11004 provides and ASMC SDK 11003 receives "OK."

In step 11015 ASMC SDK 11003 provides and STB media player 11002 receives "handle."

In step 11016 STB media player 11002 calls and ASMC SDK 11003 receives ASMC_Decrypt(handle,dec_type, enc_content_block,IV,isLastBlock, . . . )

In step 11017 ASMC SDK 11003 invokes and Hardware Interface Module 11004 receives HW_decrypt (enc_content_block).

In step 11018 ASMC SDK 11003 provides and STB media player 11002 receives "OK."

In step 11019 Hardware Interface Module 11004 invokes "Send Clear_content_block to Decode and Render."

Diagram 12000 depicts a use case for Initiate acquiring a license. In some embodiments, an ASM Client DRM module can "throw" notifications to a client application module. Such notifications can indicate a status, and/or request a particular action to be initiated.

If a valid license does not exist locally at the time of content playback, but was requested by the player, the ASMC DRM module can notify the client application module to initiate license acquisition. Upon successfully acquiring license in a timely manner, content playback can resume without interruption.

To some extent, diagram 12000 details content playback for iOS platform environment embodiments. Such a notification mechanism can be similar for other platforms, such as Android, PC and MAC.

In step 12010 client app 12001 calls and media player 12002 receives Play(contentURL,inHomeStatus, . . . )

In step 12011 media player 12002 parses media and extracts CPI.

In step 12012 media player 12002 invokes and iOS NSURL module 12003 receives "Custom_url_getKey (CPI)."

In step 12013 iOS NSURL module 12003 invokes and ASMC DRM-Core 12004 receives "GetKey (CPI)."

In step 12014 ASMC DRM-Core 12004 determines that a "Local license Does NOT exist."

In step 12015 ASMC DRM-Core 12004 generates a LIBundle, responsive to the CPI.

In step 12016 ASMC DRM-Core 12004 provides and client app 12001 receives a notification of license need, Notification(ASMC_NOTIFY_START_ACQUIRE_LICENSE,LIBundle). That is, ASMC DRM-Core 12004 notifies client app 12001 that a license is required, corresponding to the LIBundle of step 12015.

In step 12017 client app 12001 calls and ASMC DRM-Core 12004 receives ASMC_AcquireLicenseRequest(LIBundle, . . . ).

In step 12018 ASMC DRM-Core 12004 provides and client app 12001 receives "OK."

In step 12019 client app 12001 calls ASMC DRM-Core 12004 receives ASMC_AcquireLicenseReply( . . . ).

In step 12020 ASMC DRM-Core 12004 can store a license: "Store license."

In step 12021 ASMC DRM-Core 12004 provides and client app 12001 receives "OK."

In step 12022 ASMC DRM-Core 12004 can read a local license file

In step 12023 ASMC DRM-Core 12004 provides and iOS NSURL module 12003 receives a key "Key."

In step 12024 iOS NSURL module provides and iOS NSURL module 12003 receives "Key."

In step 12025 media player 12002 can "Decrypt and continue playback."

Step 12026 depicts selectable execution loop of steps 12014 through 12021. These steps are performed upon determining that a valid local license does not exist.

ASMC—Client DRM APIs

API syntax and definition for client ASMC SDK APIs are herein described. APIs are defined in the C programming language herein. In some embodiments, specific platforms can have APIs defined in a specific language that can correspond to the platform. By way of non-limiting examples, an iOS platform can have corresponding APIs defined in Objective-C; an Android platform can have corresponding APIs defined in Java. In some embodiments, the platforms can be iOS, Android, PC, MAC, connected TV devices, STBs, and/or game consoles. Corresponding languages can comprise Objective-C, C, C++, Javascript and/or Java.

Diagram 13000 depicts a client side ASMC SDK 13003 comprising DRM APIs 13004 13010, DRM Plugin API 13005 13030, and MediaPlayer API 13006. These client side application programming interfaces can provide DRM services for a client application component 13001. A client application 13001 can comprise a media player component such as MediaPlayer 13002. The media player component can have access to ASMC SDK components DRM Plugin API 13005 13030 and MediaPlayer API 13006 13040.

ASMC_Init 13011 can instantiate a new ASMC Client.

| syntax/definition | ASMC_RESULT ASMC_Init(void* storageSpaceHandle) |
|---|---|
| Parameters | storageSpaceHandle: Application context handle. Handle to persistent storage space. Eg: device's internal storage specific to the application. Null - if platform has default persistent storage space. Eg: iOS sandbox. |
| Returns | On Success: ASMC_SUCCESS On Error: Error messages |
| Type | Synchronous API |

ASMC_Close 13012 can clear the initialization.

| syntax/definition | ASMC_RESULT ASMC_Close( ) |
|---|---|
| Parameters | None |
| Returns | On Success: ASMC_SUCCESS |
| Type | Synchronous API |

ASMC_GetProvisioningRequest 13013 can be employed by a client application to create a DRM message blob that can be sent to an OPUS server, in order to get client provisioning information. Such provisioning information can comprise a client certificate. This API can return FQDN of a server. In some embodiments, the application layer can treat the DRM message blob as an opaque data set. The message blob can be well defined in a DRM component.

| syntax/definition | ASMC_RESULT ASMC_GetProvisioningRequest (byte* out_drm_msg_blob, int* out_drm_msg_blob_length, char* out_prov_fqdn) |
|---|---|
| Parameters: | |
| out_drm_msg_blob | Output parameter. The DRM message blob as byte array. |
| out_drm_msg_blob_length | Output parameter. The DRM message blob length. |
| out_prov_fqdn | Output parameter. Default FQDN of the OPUS server. |
| Returns | On Success: ASMC_SUCCESS On Error: Error messages |
| Type | Synchronous API |

ASMC_ProcessProvisioningReply 13014: A client application module can use this API to complete client provisioning, by submitting data received from the OPUS server. The application module can deliver a DRM message blob (per description herein of ASMC_GetProvisioningRequest 13013) to an OPUS server, and can submit the response to an ASMC DRM module using this API.

| syntax/definition | ASMC_RESULT ASMC_ProcessProvisioningReply (byte * in_opus_resp_blob, int in_opus_resp_blob_length) |
|---|---|
| Parameters: | |
| in_opus_resp_blob | input parameter. Response received from OPUS server. |
| in_opus_resp_blob_length | input parameter. Response length. |
| Returns | On Success: ASMC_SUCCESS On Error: Error messages |
| Type | Synchronous API |

ASMC_GetProvisioningStatus 13015 returns provisioning status.

| syntax/definition | ASMC_RESULT ASMC_GetProvisioningStatus (int *outProvStatus) |
|---|---|

-continued

| Parameters: | |
|---|---|
| out_provStatus | Output parameter. Indicates provisioning status.<br>AMSC_PROVISIONED - client is provisioned.<br>AMSC_NOT_PROVISIONED - client is not provisioned. |
| Returns | On Success: ASMC_SUCCESS<br>On Error: Error messages |
| Type | Synchronous API |

A client application can employ ASMC_GetLicenseRequest 13016 to create a DRM message blob. The DRM message blob can be sent to a Licensing server, in order to get content rights information and keys for a specific license.

A LII (License identification information) data structure can be defined. A LIBundle (License Identification Bundle) data structure can be defined, and can contain at least one LII.

When pre-fetching a license, a client application can get LIBundle data from a non-ASMC component. When getting a license at the time of playback, a client application can get LIBundle data from an ASMC component (notification), per the description of 'initiate acquiring a license' and as depicted in diagram 12000 herein. The application layer can treat a DRM message blob as an opaque data block. This message blob can be a well defined DRM object. The application module can deliver the DRM message blob to a license server and the server can submit the data to ASMS DRM module in order to get a response DRM message blob. The application module can call ASMC_GetLicenseRequest and ASMC_ProcessLicenseReply APIs per the description of "license acquisition" and as depicted in diagrams 8000 and 8100 herein, to complete the process of acquiring license for the content.

ASMC_GetLicenseRequest 13016:

| syntax/definition | ASMC_RESULT ASMC_GetLicenseRequest<br>(char* in_LIBundle, int in_LIBundleLen,<br>char* in_appData, int in_appDataLen,<br>bool in_continueFlag, bool in_forceFlag,<br>byte* out_ASMC_msg_blob, int* out_ASMC_msg_blob_length) |
|---|---|
| Parameters: | |
| in_LIBundle | Input parameter. License Identification Bundle (LIBundle). LIBundle data block is a bundle of License Identification Information (LII). Contains necessary information to identify license(s) to acquire.<br>Example: list of licenseID(s). |
| In_LiBundleLen | Input parameter.<br>Length of LIBundle data block. |
| In_appData | Input parameter. Application Data (appData) Application data to be interpreted by application module on client and server. This could have a list of mediaIDs. This data shall not be interpreted by the DRM module. |
| In_appDataLen | Input parameter.<br>Length of appData. |
| in_continueFlag | Input parameter.<br>True indicates: API is invoked as a response to "continue" from ASMC_ProcessLicenseReply API.<br>False indicates: This API is invoked for the first time for a specific media key, as a part of invoking multiple APIs for acquiring license for the content. |
| in_forceFlag | Input Parameter.<br>True indicates: Proceed to acquire license, even if a valid license already exists locally. |
| out_ASMC_msg_blob | Output parameter.<br>The DRM message blob as byte array. Generated by the client DRM module to be processed by the server DRM module. |
| out_ASMC_msg_blob_length | Output parameter.<br>The above mentioned DRM message blob length. |
| Returns | |
| ASMC_SUCCESS | No Error. |
| ASMC_ERR_LICENSE_ALREADY_EXIST | A valid (not expired) License for requested media license ID, already exists locally. This error code is not used if the "force" flag was present in the request. |
| Type | Synchronous API |

The client application module can use ASMC_ProcessLicenseReply 13017 to process a DRM message blob received from a License server. Return values can indicate if the process of acquiring license for the content is complete or not complete. After successfully acquiring a license, a license for live streaming content can be stored in memory, but not necessarily persisted between subsequent sessions. For sync-n-go content the license can be persistently stored on a device.

An application module can deliver a DRM message blob to a License server (as per the description of ASMC_GetLicenseRequest 13016 herein, and can submit the resulting response message blob to an ASMC DRM module, employing ASMC_ProcessLicenseReply 13017. ASMC_ProcessLicenseReply 13017 can return "ASMC_CONTINUE" to indicate that the process of acquiring licenses for the content is not yet complete. An application module can call ASMC_GetLicenseRequest 13016 and ASMC_ProcessLicenseReply 13017 per the description of "license acquisition" and as depicted in diagrams 8000 and 8100 herein, to complete a process of acquiring licenses for content.

ASMC_ProcessLicenseReply 13017:

| syntax/definition | ASMC_RESULT ASMC_ProcessLicenseReply<br>(byte* in_ASMS_msg_blob, int in_ASMS_msg_blob_length, char** out_licenseIDList, int* out_licenseIDListLen) |
|---|---|
| Parameters: | |
| in_ASMS_msg_blob | Input parameter. Response received from License server. |
| in_ASMS_msg_blob_length | Input parameter. Response length. |
| out_licenseIDList | Output parameter.<br>List of licenseIDs. LicenseID can be a fixed byte length. |
| out_licenseIDListLen | Output parameter. licenseID list length. |
| Returns | |
| On Success: | |
| ASMC_SUCCESS | Indicates license acquisition is complete. |
| ASMC_CONTINUE | Indicates license acquisition is to be continued. |
| On Error: | Error messages |
| Type | Synchronous API |

ASMC_GetLocalRightsInfo 13018 can return locally stored rights information for a specific licenseID or a list of licenseIDs. This method can be used to get rights information for a single, multiple, or all locally stored license IDs.

| syntax/definition | ASMC_RESULT ASMC_GetLocalRightsInfo<br>(unsigned char* in_licenseIDList, int in_licenseIDListLen, char** out_rightsInfoList, int* out_rightsInfoListLen) |
|---|---|

-continued

| Parameters: | |
|---|---|
| in_licenseIDList | Input parameter. List of license IDs, to get the rights information. If the list is null, it indicates all locally existing licenses. Note: Each license ID is fixed length. |
| in_licenseIDListLen | Input parameter. Indicates number of license IDs in licenseIDList. If license ID list is null, this parameter shall be zero. |
| out_rightsInfo | Output parameter. Content rights information in JSON format, as described in Section 4.3 below. Note: The rights information has license ID as one of the element. |
| out_rightsInfoLen | Output parameter. Rights information string length. |
| Returns | |
| On Success: | ASMC-SUCCESS |
| On Error: | Error messages |
| Type | Synchronous API |

ASMC_GetLocalLicenseIdentifiers 13019 can return a list of license IDs for existing licenses. Each license ID can identify a specific license. ASMC_GetLocalLicenseIdentifiers is alternatively identified as ASMC_GetLocalLicenseIDs herein.

| syntax/definition | ASMC_RESULT ASMC_GetLocalLicenseIDs (unsigned char** out_licenseIDList, int* out_licenseIDListLen) |
|---|---|
| Parameters: | |
| out_licenseIDList | Output parameter. Concatenated list of license IDs of all local licensesEach license ID can be of fixed length. |
| out_licenseIDListLen | Output parameter. Indicates number of licenseIDs in licenseIDList. |
| Returns | |
| On Success: | ASMC-SUCCESS |
| On Error: | Error messages |
| Type | Synchronous API |

ASMC_DeleteLicense 13020 can remove locally stored content rights information by deleting the corresponding license. License(s) to be deleted can be identified by licenseID and/or by mediaID. The method supports deleting multiple licenses through a list of Identifiers (licenseID/mediaID). Licenses can also have a deletion time internal corresponding to each license. Such licenses can be described as self-policing. A Client application can pass a list of licenseIDs and/or a list of mediaIDs, for deleting licenses.

| syntax/definition | ASMC_RESULT ASMC_DeleteLicense (unsigned char* in_licenseIDList, int in_licenseIDListLen, char* in_mediaIDList, int in_mediaIDListLen, char* out_deleteConfirmationData) |
|---|---|
| Parameters: | |
| in_licenseIDList | Input parameter. Concatenated list of license IDs for licenses to be deleted. Each license ID can be of fixed length. |
| in_licenseIDListLen | Input parameter. Indicates number of license IDs in licenseIDList. |
| in_mediaIDList | Input parameter. Concatenated list of media IDs for licenses to be deleted. |
| in_mediaIDListLen | Input parameter. Indicates number of media IDs in mediaIDList. |
| out_deleteConfirmationData | Output parameter. Provides authenticated proof of deletion. Data block definition TBD. |
| Returns | |
| On Success: | ASMC-SUCCESS |
| On Error: | Error messages |
| Type | Synchronous API |

ASMC_SetKey 13031 can be used by a media player to set a content key for a specific CPI data. It can return a unique DRM handle which can be used for decryption.

| syntax/definition | ASMC_RESULT MSC_SetKey(char* in_contentType, char* in_CPI, int in_CPILen, DRMHANDLE* out_handle); |
|---|---|
| Data Structure: | |
| CPI | Content Protection Information. CPI data block contains necessary information to identify a single specific license. For example, CPI can have licenseID among other information. |
| Parameters: | |
| In_contentType | Input parameter. contentType identifies the type of content format to be decrypted (e.g. MPEG part-12, HLS, WebM or DASH). |
| in_CPI | Input parameter. Content Protection Information (CPI) data block contains necessary information to identify a specific license and related content specific information. |
| In_CPILen | Input parameter. Length of CPI data block. |
| out_handle | Output Parameter. DRM handle |
| Returns | |
| On Success: | ASMC-SUCCESS |
| On Error: | Error messages |
| Type | Synchronous API |

ASMC_Decrypt 13032 can be used to decrypt media segments, after ASMC_SetKey function is successful.

| syntax/definition | ASMC_RESULT MSC_SetKey(char* in_contentType, char* in_CPI, int in_CPILen, DRMHANDLE* out_handle); |
|---|---|
| Parameters: | |
| In_handle | DRM handle received from ASMC_SetKey API. |
| In_decType | Input parameter. Indicates decryption type. |
| inputBuffer | Input encrypted buffer. |
| inputLen | Encrypted buffer length |
| In_IV | Initialization vector. |
| In_IVLen | Input parameter. Initialization vector length. |
| outBuffer | Output decrypted buffer |
| outputLen | Output buffer length |
| isLastBlock | True: indicates this is last block and to reset IV after every chunk as initial IV. |
| Returns | |
| On Success: | ASMC_SUCCESS indicates successful decryption. Output buffer will have clear data. |
| On Error: | Error messages |
| Type | Synchronous API |

ASM DRM—Rights Data Definition: The Rights Data comprises content rules associated with licensed content that can be issued by the license server. The Rights Data can be represented in JSON format. Rights Data elements are described in JSON format herein, immediately below:

| Schema Name | JSON Tag Name | JSON Field Name | Description | JSON Data Type |
|---|---|---|---|---|
| RightsInfo | | | Rights Information | Object |
| | Version | | | |
| | | Version Number | Version of the Rights data definition structure | Integer |
| | General | | | Object |
| | | Key ID | Key identifier aka licenseID | String* |
| | | ExpiryTime | Expiration time | Integer (in UTC time) |
| | | GracePeriod | Playback grace period | Integer (in seconds) |
| | | Media ID | Media Identifier | String |
| | PurchaseModel | | | |
| | | Model | Different purchase models | String ("Rental", "Subscription", "Purchase") |
| | | PlayWindow | Play window | Integer (in Days) |
| | | PlayDuration | Play Duration | Integer (in Hours) |
| | CopyControlData | | | |
| | | RCT | Redistribution Control Trigger | Integer |
| | | CIT | Constrained Image Trigger | Integer |
| | | APS | Analog Protection System | Integer |
| | | CCI | Copy Control Indicator | Integer |
| | CopyControlEnhancement | | Copy Control Enhancement | Object |
| | | AirPlayEnabled | AirPlay Enabled | Boolean |
| | | HDMIDisabled | HDMI Disabled | Boolean |
| | | DigitalCompressedDisabled | Digital Compression Disabled | Boolean |
| | | AnalogSunset | Analog Sunset Token | Boolean |
| | | AnalogDisabled | Analog Disabled | Boolean |
| | | Movable | Allowing to move licensed content | Boolean |
| | | DomainCopy | Allowing to copy licensed content within DRM domain | Boolean |

MediaPlayer APIs 13040 is a client SDK component. It can be used to control playback of media files and/or streams. The MediaPlayer API specifications herein can typically apply to PC, MAC and/or Android platforms.

ASMC_Play 13041 can start content playback, in a specified surface view. Play can start from the very beginning of a content file or stream. If the Seek API is called just prior to ASMC_Play, play can proceed from a position specified by Seek. In order for an application to bookmark a playback position, it can call getCurrentPosition to record the position. Subsequently, when playback is to be restarted, it can employ a Seek call to pass in the bookmarked position, immediately prior to a play call.

| | |
|---|---|
| syntax/definition | void ASMC_Play(string contentURI, SurfaceView view, enum inHomeStatus) |
| Parameters: | |
| contentURI | The content URI. |
| View | Surface view is specific to Android platform. |
| inHomeStatus | Indicates if the client device is playing the content in-home or out of home or not applicable. Example: enum inHomeStatus {in-home, outside-home, not-applicable} |

-continued

| | |
|---|---|
| Exceptions: | |
| FileNotFoundException | content file not found exception |
| InvalidRegistrationMSCException | exception to indicate that the device does not have valid registration status. |
| Type | Synchronous API |

ASMC_Pause 13042 can pause content playback.

| | |
|---|---|
| syntax/definition | Void ASMC_Pause( ) |
| Type | Synchronous API |

ASMC_Resume 13043 can resume content playback after a pause.

| | |
|---|---|
| syntax/definition | Void ASMC_Resume( ) |
| Type | Synchronous API |

ASMC_Stop 13044 can stop content playback. It clears the media player resources.

| syntax/definition | Void ASMC_Stop( ) |
|---|---|
| Type | Synchronous API |

ASMC_Seek 13045 can set a play position to an input time offset. The offset can be requested in seconds.

| syntax/definition | ASMC_RESULT ASMC_Seek(ASMC_Time startPosition) |
|---|---|
| Type | Synchronous API |

ASMC_GetCurrentPosition 13046 can return a current content position. The position can be specified in terms of time offset in seconds.

| syntax/definition | ASMC_Time ASMC_GetCurrentPosition( ) |
|---|---|
| Type | Synchronous API |

ASMC_EnableFullScreen 13047 can toggle a player screen (view) size between full screen and small screen, depending on a value of the input parameter.

| syntax/definition | void ASMC_EnableFullScreen(Boolean isFullScreen) |
|---|---|
| Parameters: | |
| FullScreen | If isFullScreen is true the player can capture the size specified in the setFullScreenSize API. If isFullScreen is false, the player can capture the size specified in the setSmallScreenSize API. |
| Type | Synchronous API |

ASMC_SetDisplay 13048 API can be called whenever the surface is changed. For example, a foreground to background change can require a call to this method in order to re-set the surface. In some embodiments, this method can be specific to Android platforms.

| syntax/definition | void ASMC_SetDisplay(SurfaceHolder sh) |
|---|---|
| Parameters: | |
| Sh | Surface Holder. Ex: android.view.SurfaceHolder. |
| Type | Synchronous API |

ASMC_SetEventListener 13049 can be used to register a listener. A registered listener can thereby get notifications to render closed captions, and/or to get DRM errors for Playback and play completion.

| syntax/definition | void ASMC_SetEventListener(OnEventListener listener) |
|---|---|
| Parameters: | |
| Listener | Listener object |
| Type | Synchronous API |

ASMC_SetSmallScreenSize 13050 can set a small screen size.

This method can set a video render position and size depending on the value of the origin (represented by x and y), and width and height parameters. In some embodiments, a call this method or setFullScreenSize can be required, in order to enable video on screen.

| syntax/definition | void ASMC_SetSmallScreenSize(int x, int y, int width, int height) |
|---|---|
| Parameters: | |
| x, y | Origin position of the video screen. |
| Width, height | Width and height of the video screen. |
| Type | Synchronous API |

ASMC_GetAvailableCaptions 13051 can request a list of available captions/subtitles.

| syntax/definition | ASMC_RESULT ASMC_GetAvailableCaptions (char** out_capAttributes) |
|---|---|
| Parameters: | |
| out_capAttributes | List of ISO 639-2 language codes and a one-byte flag for each, i.e. 'y' or 'n' can indicate whether it is with easy reader feature (ERF) or not. Each language can be represented as a three byte long character string. For instance the string "eng y" can indicate that English is available with ERF. English without ERF is also available can be indicated by returning two strings, i.e. "eng y" and "eng n". In a case where captions streams are present, but the language is unknown, it can return a set of reserved values starting from 'qaa'. So if there are two unknown language caption streams, one can be 'qaa' and the second 'qab'. |
| Returns: | |
| ASMC_SUCCESS | No error. |
| ASMC_ERR_PLAYER_LANG_NOT_AVAIL | Caption languages are not specified or not currently available. |
| Type | Synchronous API |

ASMC_SetCaption 13052 can Enable and disable closed captions (CC), and select a caption language. The selection can be considered a preference. In an embodiment where the caption selection is not controllable, a primary caption stream can be chosen.

| syntax/definition | ASMC_RESULT ASMC_SetCaption(bool ccSetFlag, char* language, bool withERF) |
|---|---|
| Parameters: | |
| CcSetFlag | TRUE: Turn CC ON. False: Turn CC OFF |
| Language | |
| withERF | Selected language (ISO 639-2 language code) |
| Returns: | |
| ASMC_SUCCESS | No error. |
| ASMC_ERR_PLAYER_INVALID_ACTION | Action not valid. Invalid action may also be returned in case of incorrect or unsupported language code. |
| Type | Synchronous API |

ASMC_GetAvailableAudio 13053 can request a list of available audio streams.

| syntax/definition | ASMC_RESULT ASMC_GetAvailableAudio (char** out_audAttributes) |
|---|---|
| Parameters: | |
| out_audAttributes | List of ISO 639-2 language codes and a one-byte flag, i.e. 'y' or 'n' can indicate whether a descriptive video service (DVS) is available. Each language can be represented as a three byte long character string. For instance the string "eng y" can indicate that English with DVS is available. If English without DVS is also available, two strings can be returned to so indicate: "eng y" and "eng n". |

-continued

| | |
|---|---|
| Returns: | |
| ASMC_SUCCESS | No error. |
| ASMC_ERR_PLAYER_LANG_NOT_AVAIL | Audio languages are not specified or not currently available |
| Type | Synchronous API |

ASMC_SetAudio 13054 can select an audio stream when multiple audio streams are present. Such a case can be typical of OTT embodiments. This selection can be considered a preference. If a choice is not available, a primary language can be selected.

| | |
|---|---|
| syntax/definition | ASMC_RESULT ASMC_SetAudio (char* language, bool withDVS) |
| Parameters: | |
| Language | Selected language, represented as ISO 639-2, three character code. |
| WithDVS | A boolean flag indicating with or without DVS (Descriptive Video Service). TRUE means with and FALSE means without. |
| Returns: | |
| ASMC_SUCCESS | No error. |
| ASMC_ERR_PLAYER_INVALID_ACTION | Action not valid. Invalid action can also be returned in case of incorrect or unsupported language. |
| Type | Synchronous API |

Diagram 14000 depicts a server side ASMS SDK 14003 comprising DRM APIs 14004 14010. These server side application programming interfaces, illustrated as DRM APIs 14004 14010, can provide DRM services for a License server component, such as License Service 14001. The APIs are herein described with the C programming language. Some embodiments can comprise equivalent JAVA interfaces.

ASMS_Init 14011 can initialize the overall DRM system. Initialization of the SecureMedia DRM core SDK system can be required, prior to exercising individual APIs. This call can be required at least once per each host process, in order to create a single instance of the DRM SDK core module within a user thread and/or process. Additional calls to ASMS_Init 14011 with different parameters can increment instance counts. In some embodiments such instance counts can be employed for closely coupled calls.

| | |
|---|---|
| syntax/definition | int ASMS_Init(void* crl_cb_handle) |
| Parameters: | |
| Crl_cb_handle | Call back handle (function pointer) to check for CRL |
| Returns: | On Success: SMHN_SUCCESSFUL, if the call is successful. On Error: Error messages |
| Type | Synchronous API |

ASMS_Close 14012 can de-initialize the overall DRM system for each instantiated object. This call can typically be invoked at least once before each user process and/or thread is terminated and as the last call to the DRM system. For each ASMS_Init API, a pairing call to this API can properly terminate the corresponding DRM instance. A last call to this API can close the instance and perform clean up of outstanding memory allocations.

| | |
|---|---|
| syntax/definition | int ASMS_Close( ) |
| Returns: | ASMS_SUCCESSFUL, if the call is successful. ASMS_Error code otherwise. |
| Type | Synchronous API |

A License server module can employ ASMS_RetrieveKeyIDs 14013 to retrieve a list of key IDs from a client DRM message blob.

| | |
|---|---|
| syntax/definition | ASMS_RESULT ASMS_RetrieveKeyIDs(byte* in_ASMC_msg_blob, void* out_handle, unsigned char** out_keyIDList, int* out_keyIDListLen) |
| Parameters: | |
| in_ASMC_msg_blob | Input parameter. DRM message blob from client, to be processed. |
| out_handle | Output parameter. DRM handle. |
| out_keyIDList | Output parameter. Concatenated list of key IDs. Each license ID can be of fixed length. |
| out_keyIDListLen | Output parameter. Indicates length of keyIDList. |
| Returns: | On Success: ASMC_SUCCESS. On Error: Error messages |
| Type | Synchronous API |

The License server module can use ASMS_CreateLicense 14014 to create license(s) and to securely package them into a server DRM message blob. The DRM message blob can be processed by ASMC client DRM module. The License server can send the server DRM message blob to a client Application, to be processed by a client DRM module.

| | |
|---|---|
| syntax/definition | ASMS_RESULT ASMS_CreateLicense (void* in_handle, void* in_struct_keyInfo[ ], int in_struct_keyInfoLen, byte* out_ASMS_msg_blob, int* out_ASMS_msg_blobLen) |
| Parameters: | |
| in_handle | Input parameter. DRM handle. |
| In_struct_keyInfo[ ] | Input parameter. A list of keyInfo structure. In_struct_keyInfo structure can contain: KeyID Key KeyLen Rights information Rights information length Example: struct keyInfo{ unsigned char* keyID; unsigned char* key; int keyLen; char* rights_info; int rights_info_len; }; Refer to ASM DRM - Rights Data Definition |
| in_struct_keyInfoLen | Input parameter. Length of the list of media key info structure. |
| out_ASMS_msg_blob | Output parameter. Response DRM message blob. |
| out_ASMS_msg_blobLen | Output parameter. The above mentioned DRM message blob length. |
| Returns: | On Success: ASMC_SUCCESS. On Error: Error messages |
| Type | Synchronous API |

System Architecture Overview
Basic Client Model

The basic client model comprises a DRM function represented by a library (statically or dynamically linked), a Player function and an application. In embodiments employing a software player, such as Android environments, the player can have a plug-in that interfaces to a DRM function that decrypts content. In other embodiments, such as iOS, the player can directly decrypt content. An application is not required to run the DRM function as a "process." The application can merely call each of the defined APIs, as needed, in order to make use of the DRM function services.

An application can tell the client library to "request a license" whenever a service choice is made.

A player can receive content with "content protection information" (CPI). The CPI can be a keytag (such as for HLS) or equivalent information. Equivalent information can be from a DASH MDP or an ECM equivalent. All of these can be described as a mechanism indicating the specific content key in use.

Upon new reception of a keytag or equivalent, which references a new content key, the player can send the keytag or equivalent to its plug-in component. Such plug-in embodiments can comprise hardware and/or software. The plug-in can extract any relevant information, such as an initialization vector (IV), and send a key request to the DRM library. The DRM library can return the key to the plug-in, in a plug-in dependent manner. Thus the application can operate without directly processing a key.

The platform dependent interface can flexibly support the use of NSURL for Apple iOS clients, an obfuscated DRM decryption plug-in for Android software players, and/or hardware related solutions for TEE architectures and STBs.

Temporal Key Change

For linear (broadcast) channels, keys can change over time. A license request can allow for multiple time slot keys to be returned if desired, such as current and next. In some situations, the next key is not yet prepared, in order for security to be maintained. in some example embodiments, a system might offer its 'next' key an hour before its use, but not 24 hours, if that is the key change rate.

A mechanism can request the new (next) license and thus next keys during a broadcast. Thus, License requests can return all licenses that are determined relevant by the infrastructure. Such licenses can be referenced by an N byte content "license ID". In some embodiments of linear services, (the case for temporally changing keys), infrastructure can return two keys (and license IDs), current and next. Some typical VOD application embodiments can require just a single content key and license.

One approach to acquiring the relevant linear channel content keys attaches a DRM specific field (called "License Identification Bundle") to content directory WebPages or descriptions. In such a case, infrastructure can deduce which current and next key is appropriate to return to the DRM subsystem upon a subsequent request for a license.

A second approach can use a transaction involving the client application and its infrastructure, which returns the relevant content key licenses. Identifying and/or providing the relevant content key licenses can be based upon system specific data such as the linear channel asset name.

In a third approach, an application requests no license at acquire time. Instead, the player can process the content URL, receive the initial content or playlist or MPD, discover which license and thus which key is required, and request it from the DRM library. The client DRM library can provide a notification to the application layer when it is requested to provide a key for which it does not have a license. Thus the application can issue a real-time license request, and attempt to acquire the key in time to reply to the player plug-in. Such a notification can typically be used for an error case. In some embodiments, acquisition can be relatively more reliable and/or rapid if either of the first two approaches are employed.

The application layer can drive license requests, and the application can have awareness of what type of service is being viewed. Notably, in some embodiments, more than one license request can be subsequent to and associated with a specific instance of provisioning with certificate. The application layer may require knowledge of when a new license might be required, in order to request the license adequately in advance of when needed. The relevant keys can be defined, managed and timed by the operator infrastructure, so that the client application layer can be provided with whatever knowledge it requires of the time to request a new license. If an initial license request is made near a key change boundary, two licenses may be returned in response. If a request is made far from such a boundary, a single license may be returned in response, as the infrastructure defines. For a specific license ID request, if a license ID is associated with a desired asset, the correct key(s) are returned in the content license.

Multiple Component Keys Per Service

Some embodiments support multiple component keys per service. In alternative DRM embodiments, different keys can be assigned to audio and video, or other components, as defined by the content standard in use. In this case, the infrastructure can return a set of licenses as needed. For linear services, a current set and a next set can be returned. For additional flexibility, each license can comprise an application defined field called the "media ID," which allows for identifying a group of licenses as being related to a single media asset.

Optimal Linear Service Acquisition

Some embodiments support optimal linear service acquisition. Multiple linear channel licenses can be delivered on a single request, since a consumer's subscription status can be known. The API can comprise a 'continue' flag, so that a request to deliver tens or hundreds of licenses can be broken up as desired. In some embodiments, the licenses can be broken up into a smaller current viewed channel license set, for quick acquisition, and a set of all subsequent licenses.

An embodiment providing multiple linear channel licenses corresponding to a single request is herein depicted and described in diagrams 8000 and 8100. License cues 8118 can comprise, inter alia, a consumer's subscription status. By way of non-limiting example, licenses can be requested and hence obtained corresponding to content recommended to a user, such as content specifically identified within a program guide and/or catalog.

Licenses can comprise deletion times. Thus, license storage can be described as self-policing. Upon application calls to the DRM library, license storage can be reviewed and old licenses can deleted. As a further optimization, upon a license request, the DRM library can check which licenses it already has, thus avoiding unnecessary duplicate fetches.

On-Demand Linear

In the case of mobile clients, it may not be optimal to deliver licenses for other subscription channels in advance, as the particular service access may be conditioned on whether a mobile device is in home or out of home at the instant of initial service access. This can also apply to re-use of a license valid for a previously tuned channel, which can become invalid due to a transition in location. Three alternative approaches for license delivery are herein described.

First, the system can acquire a new license when requested, even if one is already present; this allows the infrastructure to examine the request's IP traffic flow and determine the in home or out of home status before replying with a license.

Second, the system can support advanced delivery, and re-use, but allow the application to delete any given license as needed. In this manner, the application can delete licenses for one or more linear assets in response to an in home/out of home transition, which can force the DRM library to acquire a new license. New licenses can be issued with the location factored in.

A third approach can be to issue all licenses with their usage rules including any in-home restriction. In this case, the DRM library can be required to support an API whereby its location can be set by the application layer. In some embodiments, such an approach may be somewhat less secure, as it may be subject to hacking of the application's location algorithm.

For flexibility, the application license request can comprise a 'force' flag, so that the DRM library can responsively delete its current license and acquire a new one. The infrastructure may also cause this action in some scenarios: a license request that returns a set of licenses can replace any internally stored licenses with the new versions. Further, a flag can be present in the rights section of the license indicating any in-home qualification.

Banding:

In some typical embodiments, several channels can have the same license, and/or the same sequence of content keys. This can allow fewer licenses to be acquired and stored, which can be advantageous for rapid acquisition and/or pre-delivery of licenses. The same license ID can be used for multiple linear channels. Thus a license ID and an application level channel or asset name would not necessarily be equivalent indicators. Typically, channels sharing a license ID referencing a specific content key can share all subsequent license IDs.

"Start Over" Services

In some embodiments, start over services for linear channels require no special handling in the DRM libraries of the client and the infrastructure. An application layer function can determine that a request can be made for a (stored) linear channel in the past, and determine that the DRM libraries can still deliver licenses and keys as directed by the infrastructure and player stream.

Secure Time

In embodiments of the DRM library that are not autonomous, there can be a limited capability to provide a secure time. A call to "acquire license" can return a current (secured) value of the current time from the infrastructure, and that time can be stored as the "last known good time." (LKGT) A request to return a key to the player for stored [local] service playback can be checked for license rights expiry. Further, local platform time can be stored at the time of LKGT, so that the LKGT can be advanced (never reversed) by estimating the apparent elapsed time from the LKGT storage time and the key request time. For some embodiments, it is recommended that the LKGT not be replaced with this estimate, as the estimate may be in error due to user clock manipulation. With this recommendation, the estimated time can be used to decide if the license has expired at the time of key request only. In this fashion, the DRM library can make its 'best guess.' Two errors can be returned to the player in the event of expiry, "expiration" and "estimated expiration." This latter can support GUI indications to the user to prompt restoration of the clock time, if desired. Notably, high value content can be flagged for a required license request at playback time, so that the secure time can be checked absolutely.

For TEE based designs, there can be hardware secure time internally to the TEE, which can make rights expiry advantageously more secure.

Domains

In the case of a group of devices assigned to a single user's domain, content sharing can be supported A device can copy an encrypted asset from the storage of one device to the storage of another, without risking theft, as the content key is not known. For an on-line device in the same domain as the first, that device can request a license. Upon the infrastructure determining the other device to be "in the domain" and the content to be allowed for domain access, a license can be returned.

In the case of an off-line device, one that is outside of current network connection, access can still be supported if the infrastructure system can selectively re-encrypt its assets per user. That is, a set of locally stored content in the domain accessible category for user N can be delivered initially re-encrypted in a new key selected for all such content, but only for that single user domain. Each device can be granted that single license in advance, and can share content "at will."

Some embodiments of the DRM system require direct support for domains, in which off-line devices must support domains without infrastructure re-encryption. Specifically, a key and key ID can be allocated for a user domain key [per user], and that key's license pre-distributed to the members of that domain. Content downloaded to a member of the domain can come with a normal license [directed to the device] as well as a special "domain license." This special license can contain the content key encrypted under a domain key common to all domain members. The license can carry a flag indicating that it is a domain license, and can also include the key ID of the user domain key.

Although the present invention has been described above with particularity, this was merely to teach one of ordinary skill in the art how to make and use the invention. Many additional modifications will fall within the scope of the invention, as that scope is defined by the following claims.

The invention claimed is:

1. A method for digital rights management of licensed video media content, comprising:
  issuing a digital rights management license request corresponding to first media content, responsive to a unique client certificate, the first media content comprising one or more elements of the video media;
  receiving a first digital rights management license corresponding to the first media content, responsive to the digital rights management license request;
  receiving one or more additional digital rights management licenses corresponding to second media content, responsive to the digital rights management license request;
  deriving a content key from the first digital rights management license;
  initiating play of one or more elements of the first media content;
  playing one or more elements of the first media content, responsive to the content key;
  wherein a client application on a video player is configured to issue the digital rights management license request, to receive the first digital rights management license, and to receive the additional digital rights management licenses; and wherein a digital rights management client module providing the video media is configured to derive the content key.

2. The method of claim 1, further comprising:
providing an online personalization update server;
wherein the online personalization update server provides the unique client certificate.

3. The method of claim 1: wherein the specified operating system platform is an iOS platform, an Android platform, a PC platform, or a MAC platform.

4. The method of claim 1, further comprising the step of:
issuing one or more additional digital media rights license requests, responsive to the unique client certificate.

5. The method of claim 1, further comprising the steps of:
providing an operator infrastructure comprising a server application; and,
providing a digital rights management server module;
wherein the server application is configured to invoke the digital rights management server module to provide the first digital rights management license and the additional digital rights management licenses;
wherein the digital rights management server module is configured to provide the first digital rights management license and the additional digital rights management licenses.

6. The method of claim 5 further comprising the steps of:
providing a license identification bundle, comprising a plurality of license identification information structures;
requesting a plurality of digital rights management licenses within the first transaction;
wherein the plurality of digital rights management licenses respectively correspond to the plurality of license identification information structures; and,
wherein the license identification bundle is provided prior to issuing the digital rights management license request.

7. The method of claim 5 further comprising the steps of:
providing a license identification bundle, comprising a plurality of license identification information structures, and subsequent to initiating play of one or more elements of the first media content;
requesting a plurality of digital rights management licenses within the first transaction;
wherein the plurality of digital rights management licenses respectively correspond to the plurality of license identification information structures; and,
wherein the digital rights management client module is configured to provide the license identification bundle.

8. The method of claim 5 further comprising the steps of:
providing a first transaction that comprises issuing the digital rights management license request;
processing a plurality of interactions;
completing the first transaction; and,
initiating play of one or more elements of the first media content;
wherein the plurality of interactions comprises interactions between the client application and the digital rights management client module, and, interactions between the digital rights management client module and the digital rights management server module.

* * * * *